United States Patent [19]

Forbes

[11] 3,806,814

[45] Apr. 23, 1974

[54] PHANTOM SUBSCRIBER

[75] Inventor: F. Douglas Forbes, Palos Verdes Peninsula, Calif.

[73] Assignee: Hughes Aircraft Company, Culver City, Calif.

[22] Filed: Apr. 26, 1972

[21] Appl. No.: 247,616

[52] U.S. Cl......... 325/309, 178/DIG. 13, 178/69 R, 179/15 BB, 179/170 F, 325/31, 325/53

[51] Int. Cl. .......................................... H04b 3/04

[58] Field of Search.... 178/69 R, 69 A, 69 F, 69 G, 178/69 L, 69 M, 69 N, 70 R, DIG. 13; 325/2, 51, 53, 54, 308, 309, 31, 55, 5, 12, 13; 340/147 LP, 150; 333/18; 179/15 AD, 15 AT, 15 BB, 170 R, 170 F, 170.8, 175.3, 175.31

[56] References Cited

UNITED STATES PATENTS

| | | | |
|---|---|---|---|
| 3,496,308 | 2/1970 | Godfrey | 179/170 F |
| 3,050,712 | 8/1962 | Bruck | 340/150 |
| 3,047,678 | 7/1962 | Ingram | 325/2 |
| 3,619,783 | 11/1971 | Ritter | 325/31 |
| 3,668,307 | 6/1972 | Face et al. | 178/DIG. 13 |

OTHER PUBLICATIONS

"Two Way Applications for Cable Television Systems in the '70's" Ronald K. Jurgen IEEE Spectrum Applications Report - November 1971, pages 39-54.

*Primary Examiner*—Richard Murray
*Assistant Examiner*—Marc E. Bookbinder
*Attorney, Agent, or Firm*—Don O. Dennison; W. H. MacAllister

[57] ABSTRACT

A system for enabling a plurality of first circuits to selectively control such functions as gain, slope, bandpass and switching of all transmissions passing through a signal distribution network between a central station and a plurality of subscriber stations. In one embodiment a plurality of second circuits is disposed at preselected positions in the distribution network. In response to addressed commands from the central station each second circuit causes a plurality of command data to be respectively stored in a plurality of associated third circuits. Each of the associated third circuits in turn controls the operation of an associated first circuit as a function of the command data applied thereto.

18 Claims, 14 Drawing Figures

PHANTOM SUBSCRIBER

BACKGROUND OF THE INVENTION

1. Field of the Invention

This invention relates to cable television systems and particularly to a system for selectively controlling the operation of all transmissions passing through a distribution network between a central station and a plurality of subscriber stations.

2. Description of the Prior Art

Some communications, telecommunications or cable television systems utilize the amplitude of one or more pilot signals to control either or both of the gain and tilt of a line amplifier coupled in series between a transmitting terminal and a receiving terminal.

Another communications system has been proposed in which a sample of the level of the broadband signal received at each of several repeater stations located between a pair of terminal stations is sent to the preceding repeater station in the chain and there compared with a reference level derived from the level of the broadband signal received at the preceding repeater station. A control signal is obtained through this comparison and employed to adjust the level of the broadband signal transmitted from that repeater.

In one type of proposed cable television system, circuitry coupled between adjacent line amplifiers on a distribution cable automatically adjusts the tilt of multiple channel television signals by means of a plurality of filters and attenuators.

In each of the above systems for automatically controlling the gain and tilt of line amplifiers, if there is a drift in the value of components used in any automatic sensing circuits being utilized, either or both of the gain and tilt will be changed accordingly. In general, the proposed prior art systems lack means for monitoring gradual operational changes due to the drift in the value of automatic sensing components. As a consequence, the degradation in system operation might not become noticeable until a relatively catastrophic partial or complete shutdown of the system.

In still another type of proposed communications system a system is incorporated for the remote testing of a plurality of serially-connected channel sections, such as the sections between repeater stations. In this system cable sections and repeaters for each of two channels respectively connecting two terminal stations can be individually tested from one of the terminal stations to provide an indication of faulty cable sections and repeaters.

While this remote testing system may indicate the malfunction of cable sections and repeaters, it cannot automatically compensate for the gradual degradation of components which may affect the overall operation of the system. Someone is required to travel to the identified defective channel section to manually adjust circuits or make repairs.

None of the above systems teaches the use of intermediate circuits in a cable television network which automatically perform various monitoring functions and upon command control the gain, slope, bandpass and switching of line circuits as a function of the monitored functions. Also, none of the above systems teach the use of intermediate circuits which have the capability of controlling the switching operation of preselected apparatuses upon command.

It is therefore an object of this invention to provide a novel command response system for automatically monitoring telecommunications to automatically control the gain and tilt of line amplifiers.

Another object of this invention is to provide an improved command response system for use in a cable television network.

Another object of this invention is to provide an improved system for automatically monitoring and selectively controlling frequency components within the frequency spectrum of telecommunications signals.

Another object of this invention is to provide a system in a cable television network for selectively operating switches upon command.

A further object of this invention is to provide a system for transmitting information to a processing center in regard to upstream and downstream transmissions in a cable television network and to respond to commands therefrom for performing a plurality of functions.

SUMMARY OF THE INVENTION

Briefly, a novel command response system is provided between a central station and a plurality of subscriber stations for monitoring signal transmissions therebetween and sending information thereon back to the central station. The system responds to commands from the central station, based upon the monitored transmissions, for controlling a plurality of line components to in turn control the signal transmissions. The system also has the capability of responding to commands unrelated to the monitored transmissions for controlling ancillary components to selectively perform desired operations.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figures 1, 2:
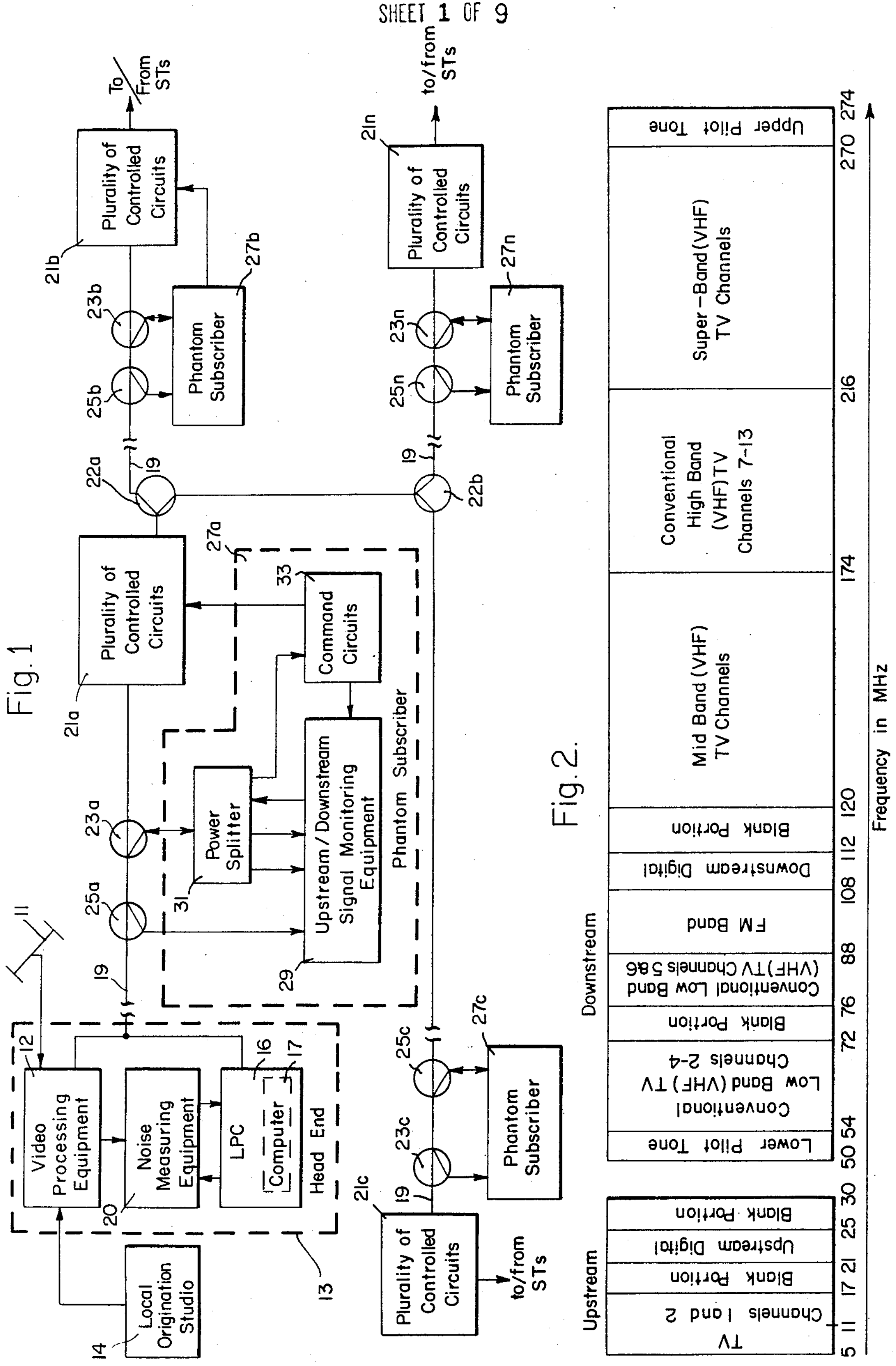
FIG. 1 is a block diagram of a two-way CATV network which incorporates the invention.
FIG. 2 illustrates a possible frequency spectrum allocation of signals in a two-way CATV system.

Referring now to the drawings, FIG. 1 discloses a two-way CATV (cable television) network which incorporates the invention. Television (TV) and, if desired, radio broadcast signals transmitted through the air are received by a plurality of antennas 11 for subsequent processing by video processing equipment 12 located at a headend site 13. Signals from a local origination studio 14, which may be located at some distance from the headend site 13, are also supplied to the video processing equipment 12 for processing. A local processing center (LPC) 16 at the headend site 13 includes a computer 17. The LPC 16 allows two-way communications between subscriber terminals (STs –not shown) and the headend site 13. Each of the outputs of the video processing equipment 12 and the LPC 16 is frequency multiplexed onto a main trunk line 19 with the other outputs for downstream transmission. Upstream transmissions from subscriber terminals are selectively received according to frequency by the LPC 16 and the video processing equipment 12. The headend 13 also contains noise measuring equipment 20, which monitors and measures in a conventional manner the noise levels and signal-to-noise ratios of the upstream transmissions to the LPC 16 and video processing equipment 12. Any noise exceeding a preselected threshold level causes the equipment 12 to generate a signal which is used by the LPC 16 to control subsequent upstream transmissions to minimize the reception of upstream noise and interference. In this connection, see the copending application of Samuel J. Curry and Sam Reisenfeld, entitled "A System for Minimizing Upstream Noise in a Subscriber Response Cable Television System", application Ser. No. 247,622, filed Apr. 26, 1972, now U.S. Pat. No. 3,750,022, and assigned to the present assignee.

Spaced along the main trunk line 19, at predetermined positions between the headend 13 and the subscriber terminals, are pluralities of controlled circuits 21*a*, 21*b*, 21*c* . . . 21*n*. As will be described in relation to FIG. 3, each plurality of controlled circuits can include upstream and downstream amplifiers, frequency-bandpass selective switches, ancillary equipment, etc. Predetermined upstream and downstream transmissions between the headend 13 and subscriber terminals pass through each plurality of controlled circuits via, for example, power splitters 22*a* and 22*b* coupled to the trunk line 19.

In close proximity to the pluralities of controlled circuits 21*a*, 21*b*, and 21*c* through 21*n*, downstream taps 23*a*, 23*b* and 23*c* through 23*n* respectively, and upstream taps 25*a*, 25*b* and 25*c* through 25*n*, respectively, are provided for supplying preselected upstream and downstream signals to a plurality of phantom subscribers 27*a*, 27*b* and 27*c* through 25*n*, respectively. These preselected signals can include pilot tones and digital transmissions.

Each phantom subscriber monitors the preselected upstream and downstream transmissions passing through the upstream and downstream taps associated therewith, and sends information on the signal strengths derived therefrom to the LPC 16 via an upstream message. The LPC 16 responds to the signal strength information transmitted from any given phantom subscriber by addressing and commanding that phantom subscriber to control the plurality of controlled circuits associated therewith as a function of the signal strength received. In addition, the LPC 16 can selectively command the plurality of phantom subscribers 27*a*, 27*b* and 27*c* through 27*n* to respectively control the pluralities of controlled circuits 21*a*, 21*b* and 21*c* through 21*n* on the basis of information stored in its computer 17. For example, commands may be utilized to turn on or off the lawn sprinkler system or outdoor lights of an apartment complex, the floodlights for a municipal stadium, a closed circuit TV or burglar alarm system for an industrial concern, etc.

Furthermore, the circuits 21*a* 21*b* and 21*c* through 21*n* may be selectively controlled by their associated phantom subscribers to either completely or partially open or close upstream or downstream paths as part of a trouble-shooting operation to isolate equipment malfunctions or minimize upstream or downstream noise. As specified before, the noise measuring equipment 20 in the headend 13 monitors all upstream transmissions to check noise levels and signal-to-noise ratios. Interference or excessive noise causes the noise measuring equipment 20 to generate a signal which is applied to the LPC 16. As a consequence of this signal from the noise measuring equipment 20, the LPC 16 goes into a search mode of operation. During this search mode of operation the LPC sequentially sends messages to command each of the phantom subscribers to selectively open one or more of the RF switches (FIG. 3) associated with each of the switching circuits under its control. For example, the LPC 16 may command the phantom subscriber 27*n* associated with the plurality of controlled circuits 21*n* to open all of the switches within its corresponding switching circuit. This command will therefore prevent any upstream video or upstream digital transmission downstream of that position on the trunk line 19 from being transmitted to the LPC 16 or the video processing equipment 20. If no appreciable decrease in the noise measured by the equipment 20 is detected, the phantom subscriber 27*n* is then commanded to close or turn on the switches in the switching circuit in the circuits 21*n* to restore upstream transmissions. As further steps in the process, the phantom subscribers 27*c*, 27*b*, and 27*a*, as well as additional intermediate phantom subscribers (not shown) can be selectively commanded in that sequence by the LPC 16 to open (and later close) the corresponding switching circuits under their control to isolate the source of interference or noise. By the above procedure the source of noise or interference can be isolated for subsequent repair. A more detailed treatment of this procedure is found in the above-mentioned copending application of Samuel J. Curry and Sam Reisenfeld.

In operation, each phantom subscriber receives, for example, upper and lower pilot tones in the downstream transmissions by way of its associated downstream tap, and any upstream digital transmission passing through its associated upstream tap. For a representative operation of a typical phantom subscriber, the operation of the phantom subscriber 27*a* will now be discussed. The upstream digital transmissions from the upstream tap 25*a* are applied directly to an upstream/-downstream signal monitoring equipment 29. On the other hand, downstream transmissions from the downstream tap 23*a* pass through a power splitter 31 before being applied to the signal monitoring equipment 29. The equipment 29 which will be described later in more detail, extracts signal information on the amplitude of the upstream digital signals and the downstream upper and lower pilot tones. Upon a command addressed from the LPC 16 to command circuits 33 in the phantom subscriber 27*a* by way of the power splitter 31, the command circuits 33 cause the equipment 29 to transmit this signal information back to the LPC 16 by way of the power splitter 31, the tap 23*a* and the trunk line 19. The LPC 16 analyzes and records this signal information from the phantom subscriber 27*a*. As a result of its analysis, the LPC 16 sends another command to the command circuits 33 to control selected ones of the plurality of controlled circuits 21*a* as a function of the signal information analyzed by the LPC 16. Furthermore, ancillary equipment (FIG. 3) in the circuits 21*a*, such as floodlights, closed circuit TV, burglar alarms, sprinkler systems, automatic telephone answering equipment, etc., may be controlled by the phantom subscriber upon commands from the LPC 16.

FIG. 2 illustrates one possible allocation of signals in the frequency spectrum of the two-way CATV system. The very high frequency (VHF) range from 50 to 274 MHz is employed in the downstream direction from the headend site 13 to the subscribers. The high frequency (HF) range from 5 to 30 MHz is employed in the upstream direction from the subscribers and phantom subscribers to the headend site 13.

The frequency bands from 50 to 54 MHz and from 270 to 274 MHz can be reserved for lower and upper pilot tones, respectively. The conventional "off-the-air" VHF television channels 2 through 6 and 7 through 13 can, if desired, be transmitted downstream at their assigned frequencies from 54 to 88 and 174 to 216 MHz, respectively. The ordinarily unoccupied frequency band or blank portion from 72 to 76 MHz can be utilized for testing or control purposes. The commercial FM broadcast band can be transmitted in its usual location from 88 to 108 MHz.

Downstream digital communications can be transmitted in a 4 MHz band (108 to 112 MHz) just above the FM band. The unassigned or blank portion from 112 to 120 MHz can be reserved for system testing or control purposes. This frequency allocation then leaves space for an additional nine nonstandard midband VHF television channels within the frequency range from 120 to 174 MHz and another additional nine nonstandard superband VHF television channels within the frequency range from 216 to 270 MHz. Some UHF television channels may be down-converted and placed on the cable of some of these additional 18 nonstandard VHF TV channels.

As shown, the upstream band of frequencies can consist of two TV channels in the 5 to 17 MHz frequency range, an upstream digital data channel in the 21 to 25 MHz frequency range, and unassigned blank portions which may be used as guard bands or test channels in the 17–21 and 25–30 MHz frequency ranges. The two upstream video channels are primarily intended for such applications as the transmission of cablecasting signals from a remote studio located anywhere along the cable system back to the headend for utilization there or for retransmission throughout the entire CATV system. The upstream digital data channel enables any of the subscribers (and phantom subscribers) to communicate with the LPC 16 at the headend site 13.

A preferable communications method for the downstream digital communication is a Manchester encoded frequency shift keying (FSK) modulated signal on a 110 MHz carrier. Digital FSK is preferable for this downstream transmission because it minimizes the complexity of the numerous subscriber and phantom subscriber receivers. The upstream digital communications preferably employs digital phase shift keying (PSK) on a 23 MHz carrier. This choice of PSK is desirable to minimize the complexity of the numerous subscriber and phantom subscriber transmitters utilized in two-way CATV systems.

It is understood, of course, that the types of transmissions, frequencies and frequency ranges described in relation to FIGS. 1 and 2 are for the purpose of explanation only and should not be understood to limit the scope of the present invention. The exemplary frequencies mentioned above correspond roughly to the bandwidths of presently available commercial CATV equipment.

Figures 3, 4:
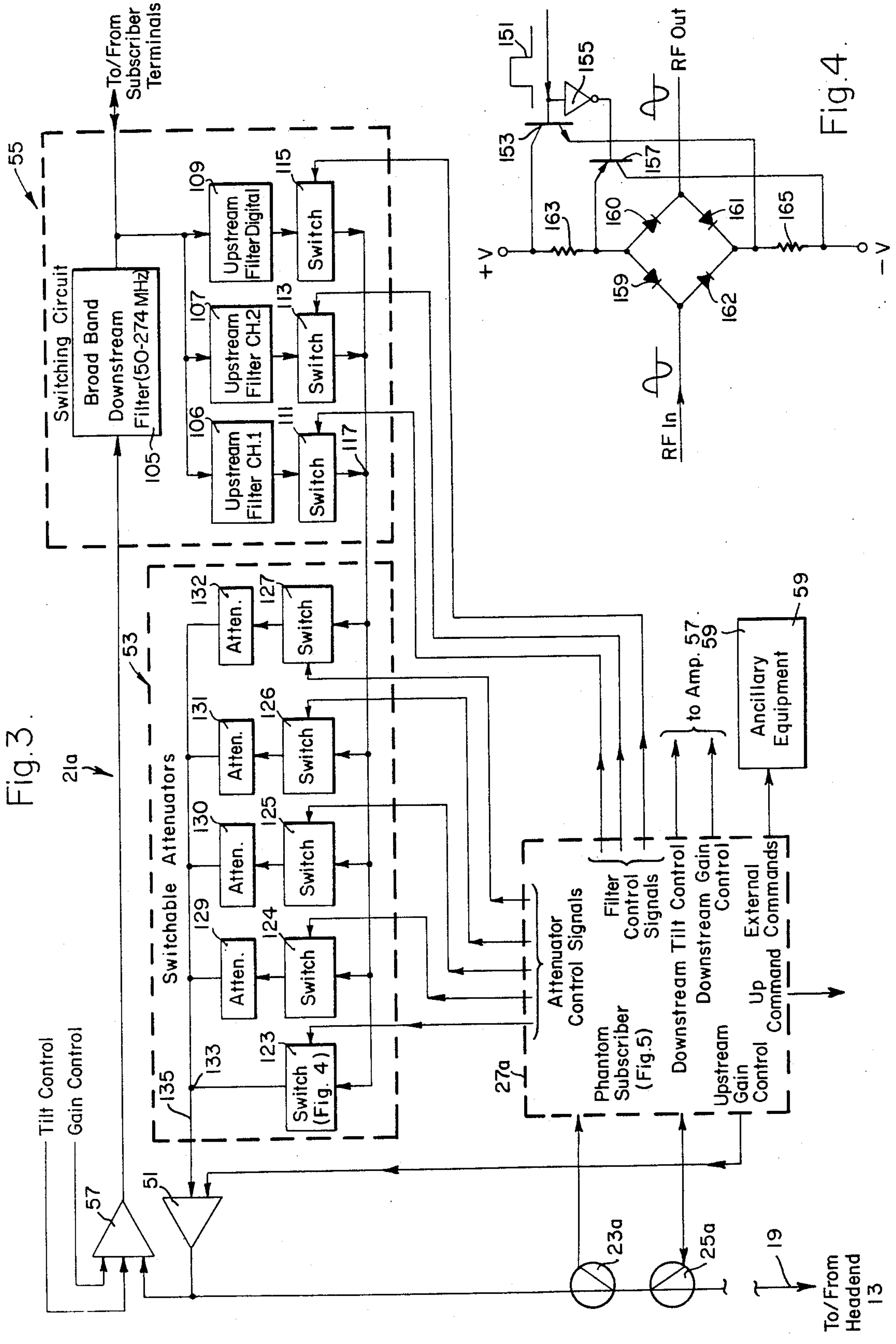
FIG. 3 is a more detailed block diagram of the plurality of controlled circuits of FIG. 1.
FIG. 4 is a schematic circuit diagram of one of the RF switches of FIG. 3.

Referring now to FIG. 3, an illustrative example of the plurality of controlled circuits 21*a* (FIG. 1), that are directly controlled by the phantom subscriber 27*a*, is shown. The circuits 21*a* can include an upstream amplifier 51, switchable attenuators 53 and a switching circuit 55, all coupled in series with the trunk line 19 between the headend 13 and subscriber terminals (not shown), as well as a downstream amplifier 57 and ancillary equipment 59. The ancillary equipment may include sprinkler systems, outdoor lights, floodlights, closed circuit TV systems, burglar alarm systems, etc. The downstream amplifier 57 may bypass the upstream amplifier 51 to the switching circuit 55 to form a two-way amplifier for compensating for cable losses in the system. The downstream amplifier 57 is a broadband amplifier designed to pass the frequencies lying in he downstream transmission band. The upstream amplifier 51 is a broadband amplifier designed to pass those frequencies in the upstream band. The amplifier 51 has its gain controlled by the phantom subscriber 27*a*, while the amplifier 57 has both its gain and tilt controlled by the phantom subscriber 27*a*. It should also be understood that the tilt of the upstream amplifier 51 could be also controlled by the phantom subscriber 27*a* in the same manner to be described in relation to the amplifier 57.

Downstream transmissions on the main trunk line 19 are amplified by the downstream amplifier 57 before being sent through a broadband downstream filter 105 in the switching circuit 55 toward additional subscriber terminals downstream. These downstream transmissions readily pass through the filter 105 since they lie within its passband of 50 to 274 MHz.

The phantom subscriber 27*a* monitors the downstream digital transmissions from the headend site 13 and in response thereto selectively generates attenuator control signals, filter control signals, an upstream amplifier gain control signal and downstream amplifier tilt and gain control signals, as well as external commands for the ancillary equipment 59. At the same time that downstream transmissions are being made, upstream video or digital transmissions or both may be made from one or more subscriber terminals. These upstream transmissions enter the switching circuit 55 where they are blocked by a broadband downstream filter 105 since they lie outside of its passband of 50 to 274 MHz. These upstream transmissions, however, are applied to upstream filters 106, 107 and 109, which pass TV or digital transmissions within their passbands for upstream TV channel No. 1 signals, upstream TV channel No. 2 signals, and upstream digital signals, respectively. The outputs of the filters 106, 107 and 109 are respectively coupled through RF switches 111, 113, and 115 to a common junction point 117, and from there to each of the inputs to RF switches 123 through 127 of switchable attenuators 53.

The filter control signals from the phantom subscriber 27A are applied to the switches 111, 113 and 115 to control the on or off operation of these switches such that all, some or none of the switches 111, 113 and 115 may be turned on at any given time. As a result, none, some or all of the two upstream TV channel transmissions and the upstream digital transmission may be passed through the switching circuit 55 into the input of the switchable attenuators 53. With all of the switches 111, 113 and 115 turned on, all three upstream transmissions may be simultaneously applied to the input of each of the RF switches 123 through 127. However, in certain situations, it may be desirable to turn off some or all of the switches 111, 113 and 115 to minimize the amount of upstream noise and/or interference received by the headend site 13.

Attenuator control signals from the phantom subscriber 27*a* are respectively applied to the switches 123 through 127 to control the on and off status of these switches such that only one of these switches is on at any given time. A plurality of attenuators 129 through 132 are respectively coupled to the switches 124 through 127 in order to attenuate the output from the switches 124 through 127 by different amounts. The output terminals of the attenuators 129 through 132, along with the output terminal of the switch 123, are coupled through a common junction point 133 on a common lead 135 to the upstream amplifier 51.

The phantom subscriber 27*a* controls the attenuation of the switchable attenuators 53 such that the output signal from the switching circuit 55 may be either unattenuated or attenuated to a desired level before it is amplified by the upstream amplifier 51. In normal operation, the switchable attenuator unit 53 does not attenuate the signal from the switching circuit 55 before applying the signal to the upstream amplifier 51. However, the phantom subscriber 27*a* may be commanded by the LPC 16 to attenuate the output signal from the switching circuit 55 to meet any desired system requirement.

Any upstream transmission from the switchable attenuators 53 is amplified by the upstream amplifier 51 before being sent toward the headend site 13. The upstream gain control signal from the phantom subscriber 27A may be an analog signal which is used to change the gain of the upstream amplifier 51 to one of a plurality of different levels, as commanded by the LPC 16.

The downstream gain control and tilt control signals from the phantom subscriber 27*a* may be analog signals which are used to change the gain and slope of the downstream amplifier 57 to compensate for CATV cable losses and losses proportional to the frequencies within he downstream frequency bandpass. The amplified and tilt-compensated output of the amplifier 57 is then sent through the broadband downstream filter 105 toward the subscriber terminals. It should be recalled that downstream transmissions completely bypass circuits in the switchable attenuators 53, and are therefore unaffected by the operation thereof.

One type of RF switch, which may be utilized in the mechanization of the switches 111, 113, 115, 123, 124, 125, 126 and 127, is illustrated in FIG. 4. In FIG. 4 a control signal, shown by the waveform 151, is applied directly to the base of an NPN transistor 153 and also through a logical inverter 155 to the base of a PNP transistor 157. A diode bridge composed of the diodes 159, 160, 161 and 162 has the junction of the commonly connected anodes of the diodes 159 and 160 coupled through a resistor 163 to a positive potential +V, and the junction of the commonly connected cathodes of the diodes 161 and 162 coupled through a resistor 165 to a negative potential −V. The RF input is applied to the junction of the cathode of the diode 159 and the anode of the diode 162, while the RF output is taken from the junction of the cathode of the diode 160 and the anode of the diode 161. To complete the connections for the circuit of FIG. 4, the collector-emitter region of the transistor 153 is coupled between the positive potential +V and the junction of the diodes 161 and 162, while the collector-emitter region of the transistor 157 is coupled between the negative potential − V and the junction of the diodes 159 and 160.

In operation, whenever the waveform 151 is in a logical 0 state, both of the transistors 153 and 157 are turned off. In this condition, all of the diodes 159 through 162 are forward biased, thereby permitting bias current to flow through the diodes. If a positive RF current is then applied to the junction of the diodes 159 and 162, current flows through the diode 162 and the voltage drop across the resistor 165 increases by the difference between the amplitudes of the input voltage and the voltage drop across the diode 162. The output voltage also increases in a positive direction by an amount approximately equal to the increase in the input voltage, such that the voltage output is equal to the sum of the input voltage plus the voltage drop across the diode 161 minus the voltage drop across the diode 162. The result is approximately equal to the input voltage if the voltage drop across the diode 162 is approximately equal to the voltage drop across the diode 161.

In a similar manner, if the negative RF current is applied to the junction of the diodes 159 and 162 when the waveform 151 is in a logical 0 state, current flows through the diode 159 and the voltage drop across the resistor 163 increases by the difference between the amplitudes of the input voltage and the voltage drop across the diode 159. The output voltage also increases in a negative direction by an amount approximately equal to the increase in the input voltage such that the voltage output is equal to the sum of the input voltage plus the voltage drop across the diode 160 minus the voltage drop across the diode 159. The output voltage is approximately equal to the input voltage if the voltage drop across the diode 159 is approximately equal to the voltage drop across the diode 160.

When the control signal 151 is in a logical 1 state, both of the transistors 153 and 157 are turned on. The conduction of the transistor 153 from + V through the resistor 165 to − V reverse-biases the diodes 161 and 162, while the conduction of the transistor 157 from + V through the resistor 163 to − V reverse-biases the diodes 159 and 160. As a result, no appreciable current will flow through the resistors 163 and 165, and no RF output developed, when the control signal is in a logical 1 state. The diode bridge can be made to switch very rapidly with little loss between the input and output junctions.

Figure 5:
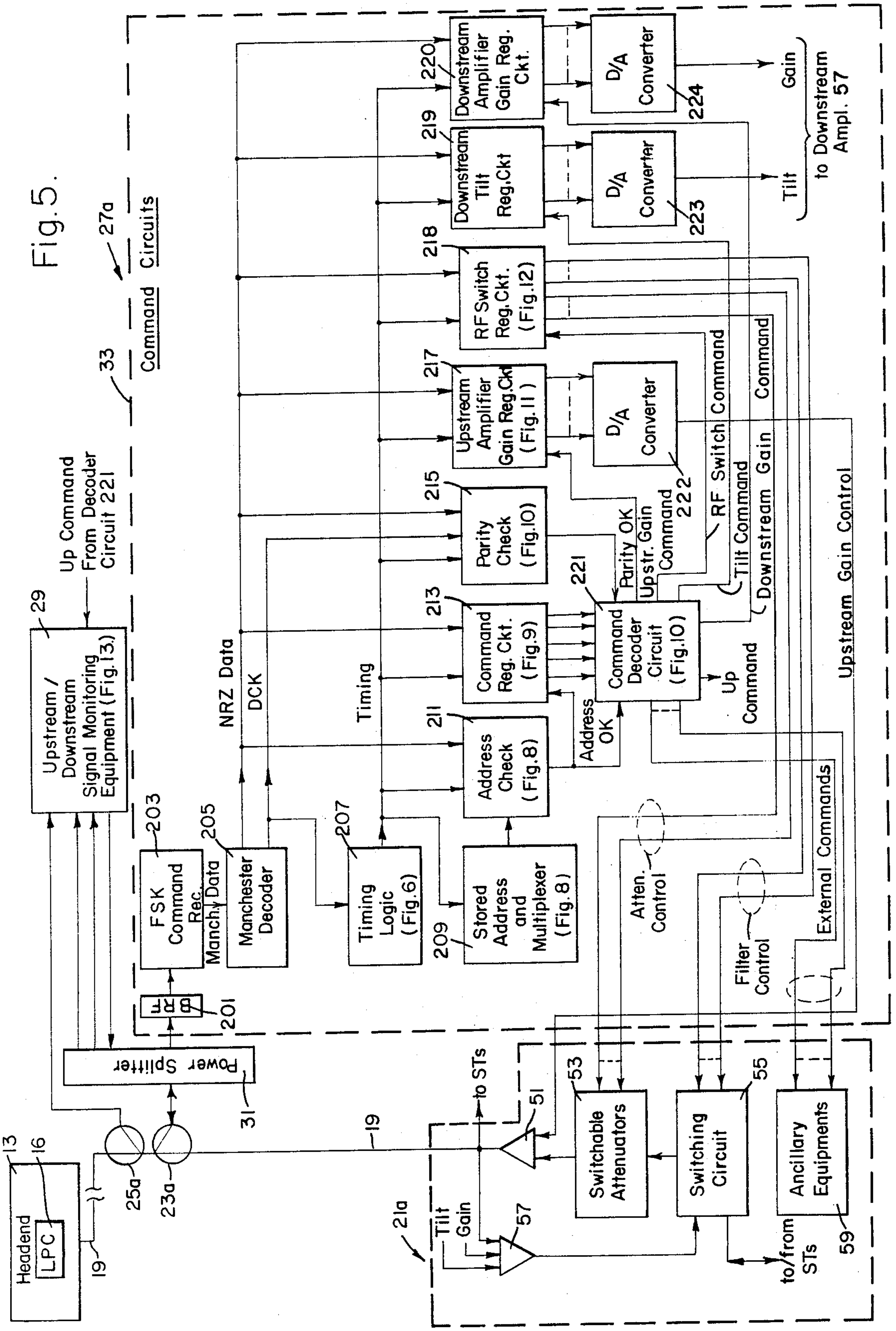
FIG. 5 is a more detailed block diagram of one of the phantom subscribers of FIG. 1.

Referring now to FIG. 5, a more detailed block diagram of the phantom subscriber 27*a* of FIGS. 1 and 3 is illustrated. The headend 13, LPC 16 and taps 23*a* and 25*a*, as well as the typical components 51, 53, 55, 57 and 59 of the plurality of controlled circuits 21*a*, which were previously discussed in relation to FIGS. 1 and 3, are also illustrated for a better understanding of the operation of the phantom subscriber 27*a*.

The downstream video and digital signals are sent through the main trunk line 19 and the serially connected taps 25*a* and 23*a* to subscriber terminals and to the downstream amplifier 57. A portion of the downstream transmission is tapped off from the tap 23*a* and applied to the power splitter 31 for ultimate utilization by the equipment 29 and the command circuits 33.

The equipment 29 monitors the downstream upper and lower pilot tones within the downstream transmissions passing through the power splitter 31, as well as any upstream digital transmissions tapped off from the upstream tap 25*a* and, upon an "up command" (to be discussed later), transmits information thereon through the power splitter 31 and tap 23*a* back to the LPC 16, as previously discussed. The LPC 16 can then put commands in its downstream digital transmissions to cause the command circuits 33 to selectively control the controlled circuits 21*a*. These commands may be derived from information stored in the LPC 16 or from the information transmitted from the equipment 29.

For utilizing the commands within the downstream transmissions, a portion of each of the downstream transmissions passing through the power splitter 31 is first applied through a band reject filter (BRF) 201 to an FSK (frequency shift keying) command receiver 203 in the command circuits 33. The BRF 201 helps prevent any upstream digital transmission (21–25 MHz) from the equipment 29 from interacting with the command circuits 33. The FSK receiver 203 demodulates the downstream transmission to recover the Manchester encoded data. The data from the receiver 203 is then applied to a conventional Manchester decoder 205 which separates the Manchester data into its components of downclocks (DCK) and non return-to-zero (NRZ) data. The downclocks are applied to a parity check circuit 215 and to a timing logic circuit 207, which generates timing waveforms. These timing waveforms are applied to a stored address and multiplexer 209, an address check 211, a command register circuit 213, the parity check circuit 215, an upstream amplifier gain register circuit 217, an RF switch register circuit 218, a downstream tilt register circuit 219 and a downstream amplifier gain register circuit 220. The NRZ data from the Manchester decoder 205 is also applied to the address check 211, the command register circuit 213, the parity check circuit 215, the upstream amplifier gain register circuit 217, the RF switch register circuit 218, the downstream tilt register circuit 219 and the downstream amplifier gain register circuit 220. For illustrative purposes, it is assumed that the NRZ data in the downstream digital message includes one start of message (SOM) bit, 16 address bits, five command information bits, one parity bit and eight command function bits.

In response to the timing waveforms from the timing logic 207, the stored address and multiplexer 209 serially reads out a stored address which, as specified above, may be 16 coded bits in length to uniquely identify the particular phantom subscriber 27*a*. The serial stream of address bits from the stored address and multiplexer 209 is applied to the address check 211 and compared bit-by-bit with the corresponding 16 bits in the NRZ data, as controlled by the timing signals from the timing logic 207. If the phantom subscriber 27*a* is being addressed by the LPC 16, the 16 address bits in the NRZ data will be identical with the 16 bits of stored address being read out from the unit 209, and the address check 211 will therefore generate an address OK signal which, in turn, is applied to the command register circuit 213 and to a command decoder circuit 221 in order to enable the circuits 213 and 221 to respond to subsequent bits of NRZ data.

If it is assumed that the phantom subscriber 27*a* has been addressed by the LPC 16, the subsequent generation of the address OK signal enables the command register circuit 213 to store the five bits of NRZ data which follows the address. As mentioned, these five bits of NRZ data constitute command information which is then applied to the command decoder circuit 221.

For increased reliability, a parity check may be utilized in the 22 bits of NRZ data which include the 16 address bits, the five command information bits and a parity bit. These 22 bits of NRZ data are applied to the parity check 215. For an odd parity check operation the LPC 16 would cause the 22nd bit to be a binary 1 if the 21 bits immediately preceding the parity bit included an even number of binary 1's for that particular phantom subscriber. In a like manner the 22nd bit would be a 0 in the event that there were an odd number of binary 1's in the 21 bits immediately prior to the parity bit. For an even parity check operation the 22nd bit would be such that the sum of all the binary 1's in the aforesaid 22 bits would be an even number.

Assume that an odd parity check has been utilized. The parity check 215 generates a parity OK signal in the event that the parity is all right. The command decoder circuit 221 then responds to the reception of the address OK and parity OK signals by allowing the five bits of command information to be demultiplexed into $2^5$ or 32 different control lines. The command decoder circuit 221 therefore allows the command circuits 33 in the phantom subscriber 27*a* to be mechanized to perform up to 32 different command functions, with each command function being initiated by a command signal on an associated one of the 32 different control lines. Other possible command functions which could be performed by other circuits (not shown) in the phantom subscriber 27*a* are: accessory power "on," accessory power "off," transmitter power "on," transmitter power "off," master disable, initialize, data request, meter read, etc.

For illustrative purposes only a limited number of output control lines are shown in FIG. 5. Of course, more than one control line could be utilized to perform any given command function. For simplicity of explanation, however, each control line here will perform one command function.

An upstream gain command (a binary 1) is applied from one of the output control lines of the decoder circuit 221 when the gain of the upstream amplifier 51 is to be changed. This upstream gain command is applied to the upstream amplifier gain register circuit 217 and operates in conjunction with the timing signals from the timing logic 207 to allow the upstream amplifier gain register circuit 217 to read in the next eight command function bits of serial NRZ data following the parity bit. The eight bits of NRZ data read into the amplifier gain register circuit 217 determine the desired gain setting for the amplifier 51 and are read out in parallel and applied to a digital-to-analog (D/A) converter 222. The converter 222 converts the digital gain information into an analog gain control signal which is used, as specified before, to change the gain of the upstream amplifier 51.

An RF switch command (a binary 1) is applied from another one of the output control lines of the decoder 221 when the operation of either or both of the switchable attenuators 53 and the switching circuit 55 is to be changed. This RF switch command is applied to the RF switch register circuit 218 and operates in conjunction with the timing signals from the timing logic 207 to allow the RF switch register circuit 218 to read in the next eight command function bits of serial NRZ data following the parity bit. The eight bits of NRZ data read into the RF switch register circuit 218 are read out in parallel, with five of the bits being used as attenuator control signals to control the attenuation of the switchable attenuators 53, and three of the bits being used to control the upstream transmissions through the switching circuit 55.

In a similar manner a tilt command, or a downstream gain command, is applied from the output control lines of the decoder 221 when the tilt, or the gain, of the downstream amplifier 57 is to be changed. A tilt command and the timing signals from the timing logic 207 allow the downstream tilt register circuit 219 to read in the next eight command function bits of NRZ data following the parity bit. These eight bits of digital tilt information are read out of the circuit 219 in parallel and converted by a D/A converter 223 into an analog tilt control signal to change the tilt of the downstream amplifier 57.

The generation of a downstream gain command and the aforesaid timing signals allow the downstream amplifier gain register circuit 220 to read in the next eight command function bits of NRZ data following the parity bit. These eight bits, which now pertain to downstream amplifier gain information for the amplifier 57, are read out of the circuit 220 in parallel and converted by a D/A converter 224 into an analog gain control signal to change the gain of the downstream amplifier 57. The circuits 219 and 220 are both similar in structured operation to the circuit 217, which is illustrated in detail in FIG. 11.

The decoder circuit 221 can also generate an up command for the equipment 29 and any of a plurality of external commands for the ancillary equipment 59 previously described. The up command enables the equipment 29 (FIG. 13) to transmit signal information back to the LPC 16 for storage and analysis, while one of the external commands enables circuits (not shown) within the ancillary equipment 59 to perform an associated predetermined operation, as indicated previously. The downstream message does not require eight command function bits of NRZ data when the message includes one of the up and external commands, since the equipment 29 and ancillary equipment 59 are each directly enabled by an associated command to perform a desired operation. As a result, the command function bits are only required for changing the gain or tilt of the amplifiers 51 and 57, as well as the attenuation and switch positions in the units 53 and 55. However, other mechanizations thereof lie within the purview of the present invention.

It should be noted at this time that when an upstream gain command is received, the following eight command function bits of NRZ data, which are read into the upstream amplifier gain register circuit 217, pertain only to digital upstream amplifier gain information. Likewise, when an RF switch command is received, the following eight bits of NRZ data, which are read into the RF switch register circuit 218, pertain only to controlling the on or off status of each of the RF switches in the switchable attenuators 53 and in the switching circuit 55. In a like manner, when one of the tilt and downstream gain commands is received, the following eight bits of NRZ specifically pertains only to the circuit associated therewith.

Each message of NRZ data directed to any given phantom subscriber such as the unit 27*a* may contain only one five-bit command followed (after the parity bit) by its associated eight-bit command function, or may contain two or more commands with each command followed by its associated command function. Of course, a longer message would be required if the message were to contain two or more commands and their associated command functions. To simplify the following discussion only one command per message will be used, since both of the above approaches, as well as various obvious modifications of FIG. 5, lie within the purview of this invention. The various circuits of the phantom subscriber 27*a* of FIG. 5 will now be described in more detail by referring to FIGS. 6 through 14.

Figures 6, 12:
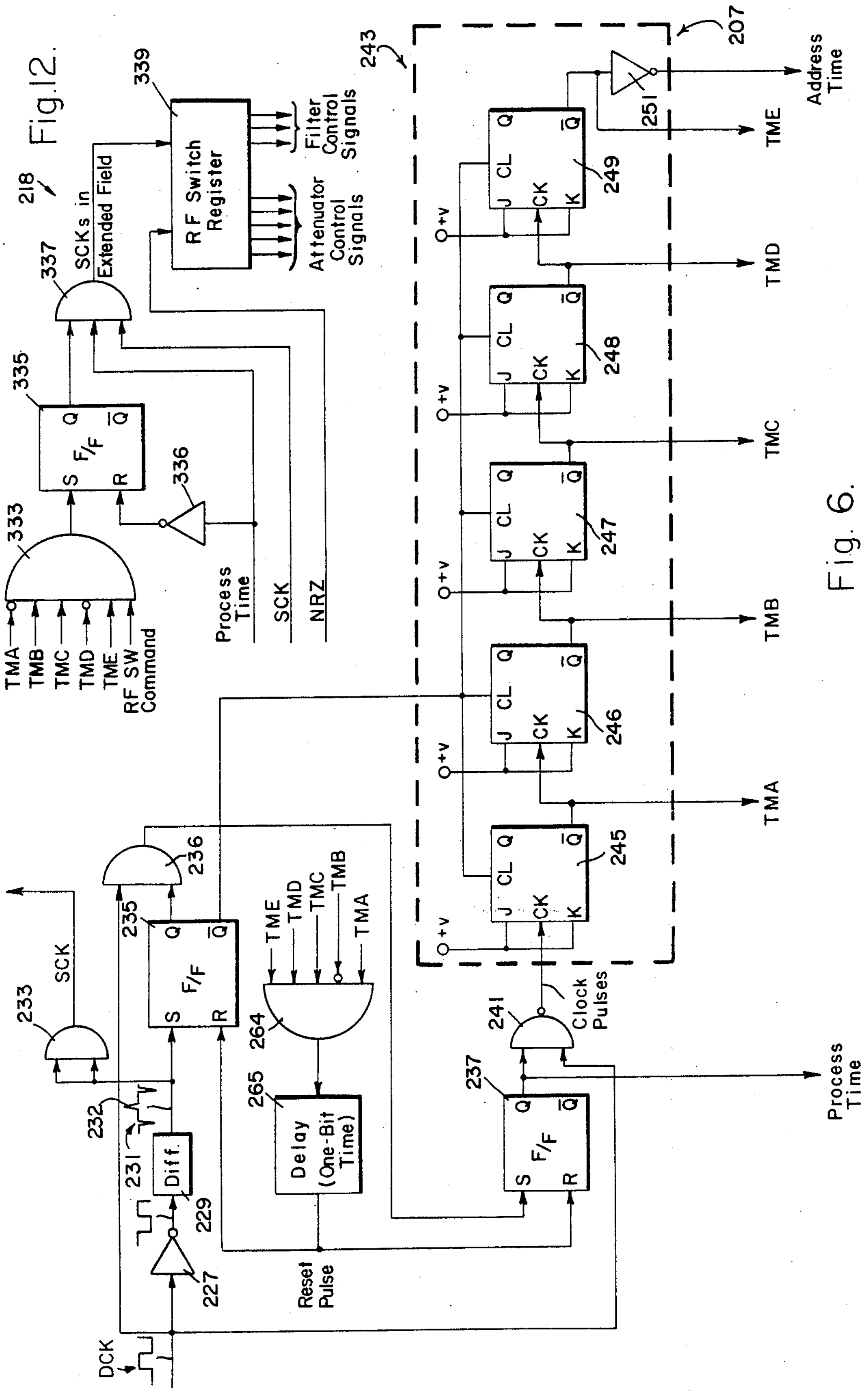
FIG. 6 is a block diagram of the timing logic circuit of FIG. 5.
FIG. 12 is a schematic diagram of the RF switch register circuit of FIG. 5.
Figure 7:
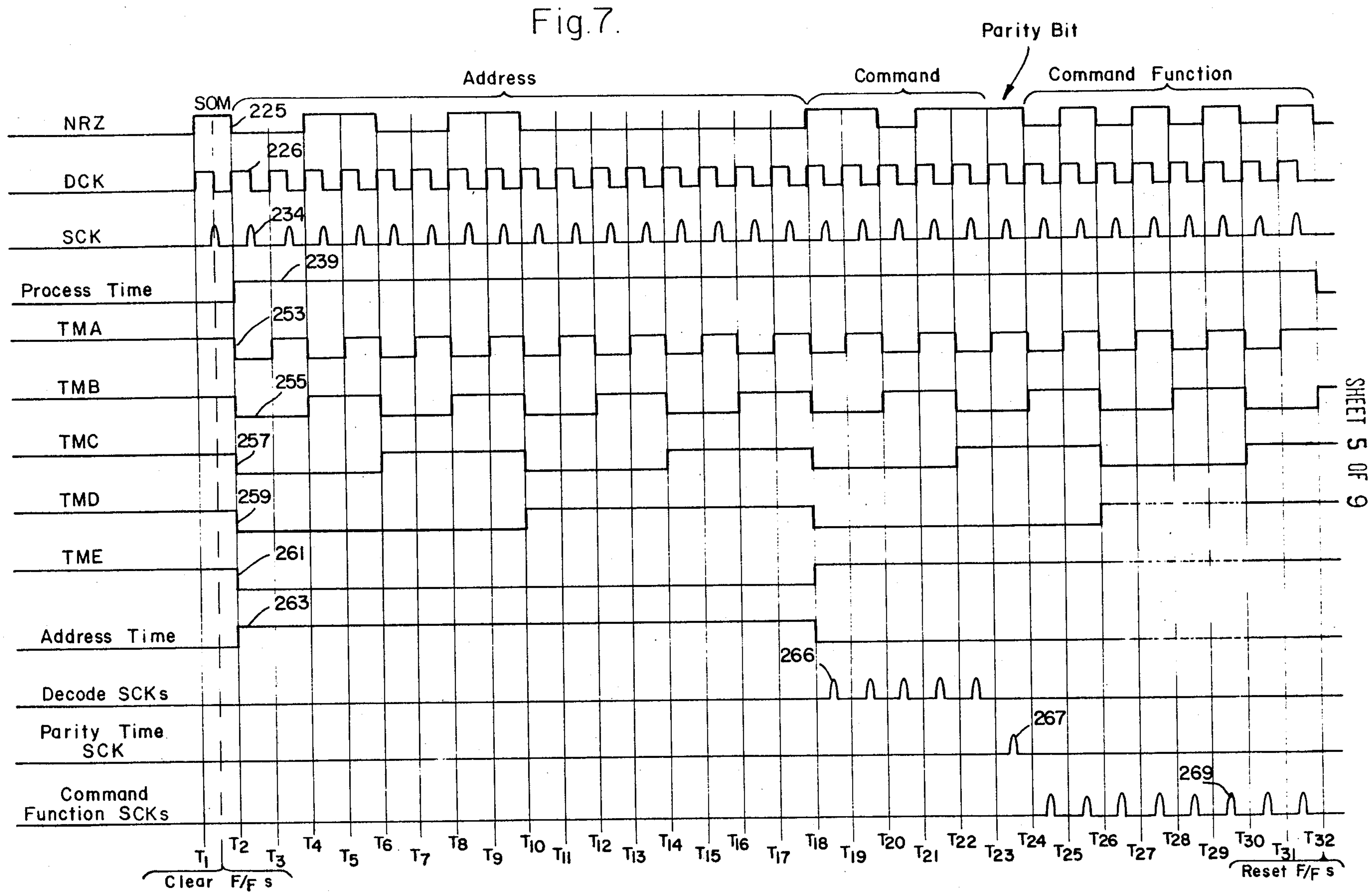
FIG. 7 illustrates waveforms useful in explaining the operation of the circuits of FIGS. 5, 6 and 8 through 14.

FIG. 6 illustrates one mechanization of the timing logic 207 of FIG. 5. The operation of the circuit of FIG. 6 can best be explained by also referring to the waveforms of FIG. 7. FIG. 7 illustrates the waveforms that are generated during the times $T_1$ through $T_{32}$, during which times the NRZ data illustrates in the waveform 225 and the downclocks (DCK) illustrated in the waveform 226 are received and decoded by the decoder 205. The times $T_1 - T_{32}$ encompass the period of time during which a transmission or message from the LPC 16 is being received by the phantom subscriber 27*a*. The message illustrated in the waveform 225 is composed of a start-of-message (SOM) bit, 16 address bits, five command bits, one parity bit and eight command function bits in an extended field to define a specific function for a specific command, although a different format could have been chosen. The first downclock, occurring at the same time as the SOM bit, is utilized to clear flip-flops and initiate the timing operation in the timing logic circuit 207, in the following manner.

Each of the downclocks 226 is sequentially inverted by a logical inverter 227 and differentiated by a differentiator 229 to develop a differentiated waveform 231 having a positive polarity spike of voltage 232. The first and all subsequent positive voltage spikes generated from the downclocks are used to cause an AND gate 233 to generate superclocks (SCK), illustrated by the waveform 234 in FIG. 7. The first differentiated positive voltage spike, developed from the first downclock, is also used to set a flip-flop 235 to cause its Q output to go to a 1 state. The 1 state from the Q output of the flip-flop 235 is applied to the lower input of an AND gate 236. The 0 state output from the $\bar{Q}$ output of the flip-flop 235 is used at this time (between times $T_1$ and $T_2$) to clear all of the J–K flip-flops illustrated in FIG. 6 to cause their Q outputs to go to a 0 state.

The positive-going portion of the second downclock applied to the timing logic 207 is applied to the upper input of the AND gate 236. Since both inputs to the AND gate 236 are in a binary 1 state at the start of the second downclock, the AND gate 236 develops a 1 state output which sets a flip-flop 237 so that its Q output goes to a 1 state. The Q output from the flip-flop 237 generates the process time waveform 239 illustrated in FIG. 7. This process time waveform 239 is applied to the upper input of a NAND gate 241. Downclocks occurring during the 1 state process time are applied to the lower input of the NAND gate 241. The NAND gate 241 inverts the downclocks occurring within the period of the process time waveform 239 to develop negative-going clock pulses which are utilized by a binary counter 243 to generate additional timing waveforms. The binary counter 243 is shown comprised of five sequentially coupled J-K flip-flops 245 through 249. The $\bar{Q}$ outputs of the flip-flops 245 through 248 are respectively applied to the clock (CK) inputs of the flip-flops 246 through 249. The negative-going clock pulses from the NAND gate 241 are applied to the clock input of the flip-flop 245. The J-K flip-flops 245 through 249 have each of their J and K inputs connected to a positive potential +V, and each of their clear (CL) inputs connected to the $\bar{Q}$ output of the flip-flop 235, as indicated previously. As a result, each of the flip-flops 245 through 249 will change its output state when a negative polarity voltage is applied to its clock (CK) input. These flip-flops 245 through 249, therefore, function together as a binary counter which counts each negative-going clock pulse from the NAND gate 241. The $\bar{Q}$ outputs of the flip-flops 245 through 249 respectively develop the waveforms TMA, TMB, TMC, TMD and TME in a conventional manner. The $\bar{Q}$ output of the flip-flop 249 is also inverted by a logical inverter 251 to develop an address time waveform which is only utilized during the period $T_2$–$T_{18}$ when the 16 address bits of NRZ data are being received. The TMA, TMB, TMC, TMD, TME and address time signals are respectively illustrated by the waveforms 253, 255, 257, 259, 261 and 263 in FIG. 7.

The TMA, TMB, TMC, TMD and TME waveforms are applied to an AND gate 264, which has its TMB input inverted. At one bit time before the completion of the downstream message to the phantom subscriber *27a* (FIG. 5), which occurs at time $T_{31}$, the TMA, TMB, TMC, TMD and TME waveforms are respectively in binary 1, 0, 1, 1 and 1 states. Therefore, at time $T_{31}$ the AND gate 264 generates a 1 state signal, which is delayed one bit time by a delay circuit 265 so that a reset pulse will be produced at the output of the delay circuit 265 at the time $T_{32}$. This reset pulse is then used to reset the flip-flops 235 and 237 to terminate the operation of the timing logic 207 until another message is received from the LPC 16. The remaining waveforms 266, 267 and 269 in FIG. 7 illustrate the superclocks (SCK) which are utilized during the decode period, parity time, and command function time, all of which are explained hereinbelow.

Figures 8, 9:
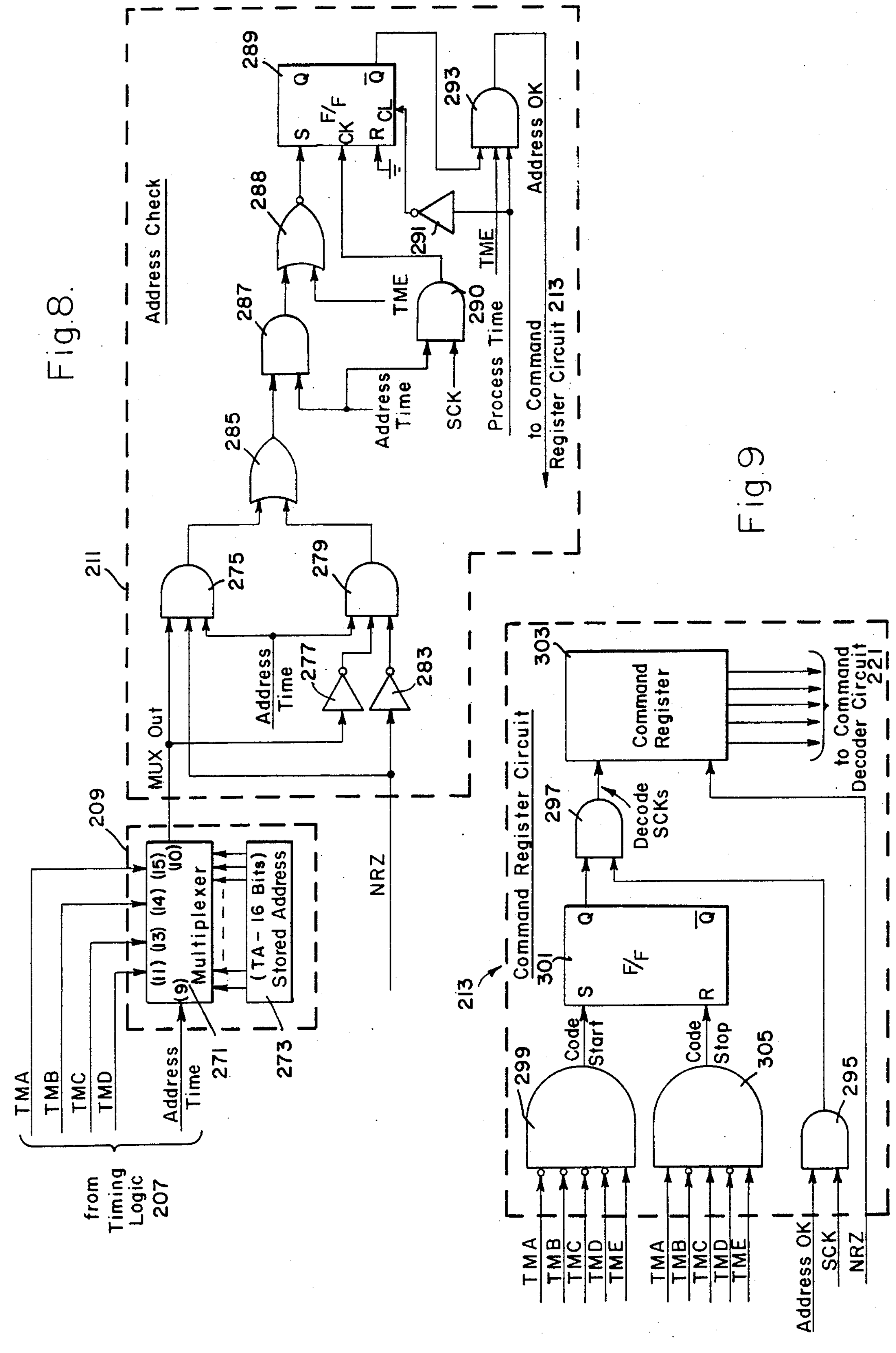
FIG. 8 is a schematic and block diagram of the stored address and multiplexer and address check circuits of FIG. 5.
FIG. 9 is a schematic diagram of the command register circuit of FIG. 5.

Referring now to FIG. 8, the stored address and multiplexer 209 and the address check 211 of FIG. 5 are illustrated in more detail. The TMA, TMB, TMC, and TMD waveforms 253, 255, 257 and 259 from the timing logic 207 are respectively applied to terminals (15), (14), (13) and (11) of a multiplexer circuit 271 to provide the proper timing therefor. The multiplexer 271 may be similar to the data selectors/multiplexers discussed from page 9–339 to page 9–343 of "The Integrated Circuits Catalog for Design Engineers," First Edition, of Texas Instruments, Inc. A stored address circuit 273, which may be a hard-wired circuit, a set of switches or a set of flip-flops, supplies 16 bits of data input information to the multiplexer 271 to identify the phantom subscriber *27a*. The address time waveform 263 is applied to a strobe input (9) of the multiplexer 271 to allow the multiplexer (MUX) to convert the 16 parallel-fed input bits from the stored address 273 into a MUX output of 16 serial bits. The MUX output at output terminal (10) of the multiplexer 271 is applied to a first input of an AND gate 275 and is also inverted by a logical inverter 277 and applied to a first input of an AND gate 279. The NRZ data is applied to a second input of the AND gate 275 and is also inverted by a logical inverter 283 and applied to a second input of the AND gate 279. The address time waveform 263 is applied to a third input of each of the AND gates 275 and 279 in order to enable them only during the address time (from $T_2$ to $T_{18}$).

AND gates 275 and 279 function, with the aid of the inverters 277 and 283, to compare the MUX output or terminal address (TA) with the 16 bits of address in the NRZ data on a bit-by-bit basis during the period of the address time ($T_2$–$T_{18}$) of the waveform 263. Whenever corresponding bits of the MUX output and NRZ data are both in a 1 state condition, the AND gate 275 develops a binary 1 which is applied through an OR gate 285 to the upper input of an AND gate 287. The address tine waveform 263 is applied to the lower input of the AND gate 287 to enable the AND gate only during the address time. Whenever corresponding bits of the MUX output and NRZ data are both in 0 states, these corresponding 0 states are inverted by the inverters 277 and 283 to cause the AND gate 279 to develop and apply a binary 1 to the lower input of the OR gate 285. In response to the application of a 1 state signal to either of its inputs, the OR gate 285 will apply a 1 state signal to the upper input of the AND gate 287. As a result, the AND gate 287 will develop a binary 1 for each of the 16 address bits occurring during the address time (times $T_2$–$T_{18}$) if the phantom subscriber *27a* (FIG. 5) is being correctly addressed.

The output of the AND gate 287 is applied to the upper input of a NOR gate 288. The TME waveform 261 is applied to the lower input of the NOR gate 288 to only allow the NOR gate 288 to develop a binary 1 state output during the address time ($T_2$–$T_{18}$) if there is an address fault (an incorrect address). The output of the NOR gate 288 is applied to the set (S) side of a clocked R–S flip-flop 289. The address time waveform 263 and SCK pulses 234 are applied as inputs to an AND gate 290, which has its output terminal coupled to the clock (CK) input of the flip-flop 289. This mechanization assures that the flip-flop 289 can only be set by a 1 output from the NOR gate 288 at the time of any of the SCK pulses occurring within the address time 263. If the flip-flop 289 has not been set before the end of the address time 263, it will remain in a "reset" condition until at least the next time the Manchester decoder 205 (FIG.5) detects another downstream message. To prevent the flip-flop 289 from being reset by a SCK pulse during the address time, the reset (R) terminal of the flip-flop 289 is grounded. To assure that the $\bar{Q}$ output of the flip-flop 289 is in a 1 state (a "reset" condition) at the start of each downstream message, the process time waveform 239 is inverted by an inverter 291 and applied to the clear (CL) input of the flip-flop 289 to clear (reset) the flip-flop 289 at time $T_{32}$ of each message. As a result, the flip-flop 298 can only be "set" by the output of the NOR gate 288 if there is an address fault within the address time ($T_2$–$T_{18}$).

The $\bar{Q}$ output of the flip-flop 289, as well as the TME and process time waveforms 261 and 239, are applied as inputs to an AND gate 293. It should be recalled that the process time waveform 239 is in a 1 state during the period $T_2$–$T_{32}$, while the TME wafeform is in a 0 state during the period $T_2$–$T_{18}$. Therefore, the AND gate 293 can only develop a 1 state address OK signal during the period of time $T_{18}$–$T_{32}$, if no address fault occurred during the period $T_2$–$T_{18}$ within which the 16 address bits of NRZ were received by the phantom subscriber 27*a*.

In operation, the address check 211 basically functions to cause its flip-flop 289 to change from a "reset" to a "set" condition if an address fault occurs at a SCK pulse time within the address time ($T_2$–$T_{18}$). At the end of the address time, $T_{18}$, the output of the AND gate 293 will be in a 1 state (address OK) if the flip-flop 289 has not been set as a result of an incorrect address bit. An incorrect address bit will occur during the address time ($T_2$–$T_{18}$) if a bit in the MUX out (station address) is not in the same binary state as the corresponding address bit in the NRZ data.

When an incorrect address bit occurs, both of the AND gates 275 and 279 will develop 0 outputs and cause the OR gate 285 to develop a 0 output. A 0 output from the OR gate 285 will cause the AND gate 287 to develop and apply a 0 output to the upper input of the NOR gate 288. In response, the NOR gate 288 will develop a 1 output, since the incorrect address bit has caused its upper input to be in a 0 state during the time ($T_2$–$T_{18}$) that the TME waveform 261 is in a 0 state and being applied to its lower input. A 1 state output from the NOR gate 288 will set the flip-flop 289 and cause its $\bar{Q}$ output to go to a 0 state. If the $\bar{Q}$ output of the flip-flop 289 is set to a 0 state, the output of the AND gate 293 will be in a 0 state condition at the time ($T_{18}$) when the TME waveform is going to a 1 state. As a result, a 1 state address OK signal will not be developed by the AND gate 293 if the terminal address does not exactly correspond with the NRZ data during the 16 bits of address time. In a like manner it should be apparent that if the flip-flop 289 has not been set before the TME waveform 261 goes to a 1 state at time $T_{18}$, a 1 state address OK signal will be generated by the address check 211 at the end of the address time ($T_{18}$) to indicate that the phantom subscriber 27*a* has been correctly addressed. The address OK signal, if generated, will be present during the period $T_{18}$–$T_{32}$. At the completion of the message ($T_{32}$), the inversion by the inverter 291 of the negative-going portion of the process time waveform 239 will cause the flip-flop 289 to be cleared or reset and therefore the output of the AND gate 293 to be changed to a 0 state, thereby terminating the address OK signal.

Assume that the phantom subscriber 27*a* has been correctly addressed by the LPC 16. The address OK signal from the address check 211 is then applied to the command register circuit 213, illustrated in FIG. 9, to allow the circuit 213 to clock-in the five command information bits of NRZ data, occurring within the period $T_{18}$–$T_{23}$. More specifically, the address OK signal is applied, along with superclocks (SCK), to an AND gate 295 to allow the AND gate 295 to pass the decode superclocks (waveform 266 of FIG. 7) to the lower input of an AND gate 297. The TMA, TMB, TMC and TMD waveforms 253, 255, 257 and 259 are applied to inverting inputs of an AND gate 299, while the TME waveform 261 is applied to a non-inverting input of the AND gate 299. The AND gate 299 will only develop a binary 1 state or "code start" signal when the TMA, TMB, TMC and TMD waveforms are each in a 0 state condition and the TME waveform is in a 1 state condition. By referring back to FIG. 7, it is seen that these conditions will only be satisfied at the time $T_{18}$. The "code start" signal that is generated at time $T_{18}$ will set a flip-flop 301 so that its Q output will go to a 1 state. The 1 state Q output of the flip-flop 301 is applied to the upper input of the AND gate 297 to allow the AND gate 297 to pass the five decode superlocks (waveform 266) to a command register 303 during the decode period, which lasts for five bit times ($T_{18}$–$T_{23}$). The NRZ data is also applied to the command register 303. This NRZ data is not stored in the command register 301 until the superclocks are received during the decode period. Only the 5 bits of NRZ data dealing with the command information or commands are desired to be stored in the command register 303. This command register 303 can be, for example, a series of five flip-flops for serial read-in and parallel read-out operation.

At the end of the command or decode period, which occurs at time $T_{22}$, the TMA, TMB, TMC, TMD and TME waveforms are respectively in binary 1, 0, 1, 0 and 1 states. The application of the TMA, TMC and TME waveforms to non-inverting inputs of an AND gate 305 and the application of the TMB and TMD waveforms to inverting inputs of the AND gate 305 therefore causes the AND gate 305 to develop a "code stop" pulse to reset the flip-flop 301 at time $T_{23}$, the completion of the decode period. The resetting of the flip-flop 301 causes its Q output to go to a 0 state to disable the AND gate 297 in order to prevent any additional superclocks from being applied to the command register 303. As a result, only five bits of command information in the NRZ data are clocked into the command register 303 during the decode period. The flip-flop 301 remains in a reset state until the phantom subscriber 27*a* is correctly addressed again. The five bits stored in the command register 303 are applied in parallel to the command decoder circuit 221 (FIG.5), which is more fully illustrated in FIG. 10, along with the parity check circuit 215.

Figure 10:
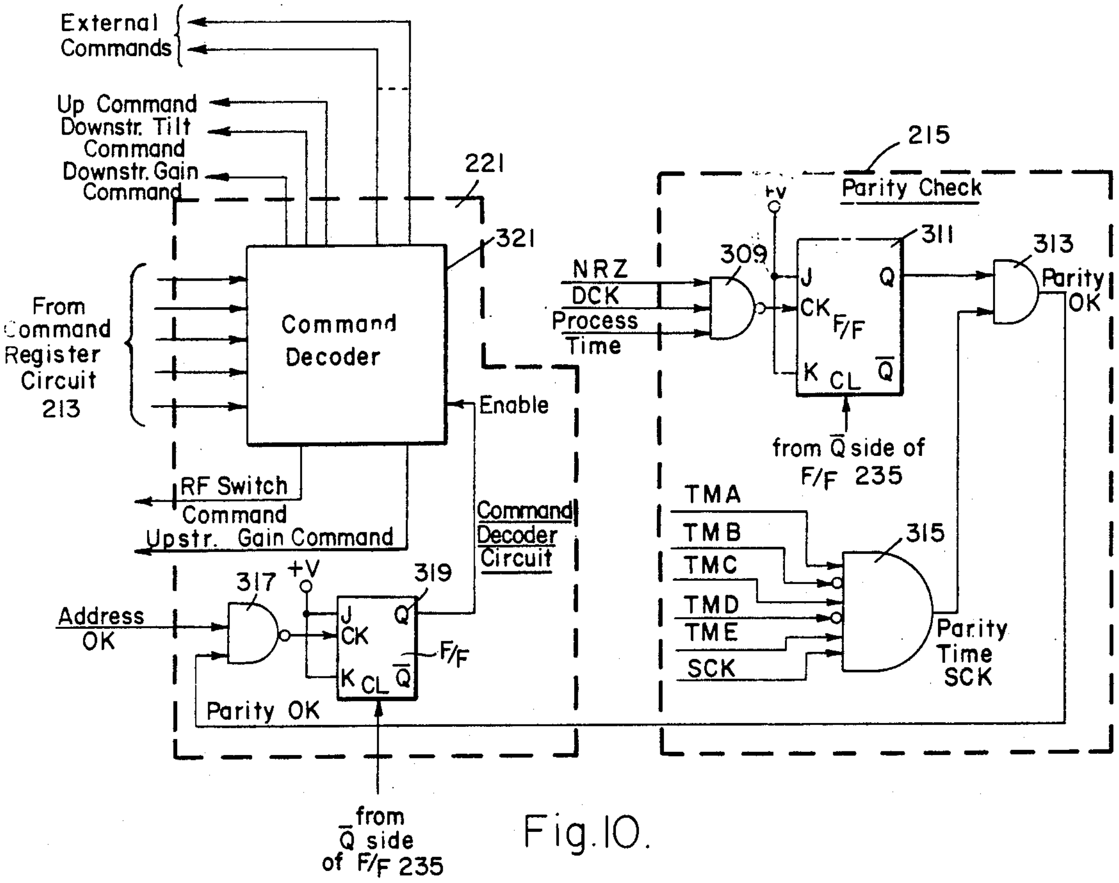
FIG. 10 is a schematic diagram of the command decoder and parity check circuits of FIG. 5.

Referring now to FIG. 10, the parity check 215 and the command decoder circuit 221 of FIG. 5 are illustrated in more detail. The NRZ data 225, downclocks (DCK) 226 and the process time waveform 239 are applied to a NAND gate 309 which has its output coupled to the clock (CK) input of a J-K flip-flop 311, which is similar in operation to the J-K flip-flop 245 in FIG. 6. The J-K flip-flop 311, like all of the J-K flip-flops in FIG. 6, is cleared by the 0 state output from the $\bar{Q}$ output of the flip-flop 235 in FIG. 6 at the time (between times $T_1$ and $T_2$) when the flip-flop 235 was set by the first differentiated positive voltage spike in the stream of downclocks applied to the timing logic 207.

During the process time ($T_2$–$T_{32}$) the NAND gate 309 develops a 0 state output at each positive-going downclock time that the NRZ data is in a 1 state. Therefore, the Q output of the flip-flop 311 will change its binary state at each positive-going downclock time occurring within the process time that the NRZ data is in a 1 state. The Q output of the flip-flop 311 is applied to the upper input of an AND gate 313. The TMA, TMB, TMC, TMD, TME and superclock (SCK) signals from the timing logic 207 are applied to the input terminals of an AND gate 315, with only the TMB inputs being inverted at their associated input terminals of the AND gate 315. During the time ($T_{23}$–$T_{24}$) that the TMA, TMB, TMC, TMD and TME waveforms in FIG. 7 are respectively in binary 1, 0, 1, 0 and 1 states, the AND gate 315 will allow the parity time superclock (SCK) shown by waveform 267 of FIG. 7, to pass through to the lower input of the AND gate 313.

As previously stated, an odd parity check is utilized in this description for illustrative purposes. Therefore, if there is an odd number of binary 1's in the NRZ data between times $T_2$ and $T_{24}$, the Q output of the flip-flop 311 will go to or be in a 1 state at the time ($T_{23}$–$T_{24}$) that the parity time SCK is generated by the AND gate 315. A correct parity check at the output of the flip-flop 311 therefore allows the AND gate 313 to generate a parity OK signal at the time that the parity time SCK is generated.

The parity OK signal is applied to the lower input of a NAND gate 317 in the command decoder circuit 221 to allow the circuit 221 to operate. A previously generated address OK signal from the address check 211 is applied to the upper input of the NAND gate 317 during the period $T_{18}$–$T_{32}$, and operates in conjunction with the parity OK signal from the parity check 215 to allow the NAND gate 317 to clock a J-K flip-flop 319, similar in structure and operation to the J-K flip-flop 245 in FIG. 6. Upon being clocked, the Q output of the flip-flop 319 changes to a 1 state enable signal. This enable signal is applied to a command decoder or demultiplexer 321 to decode the five input bits being applied from the command register circuit 213 of FIG. 9. The command decoder 321 may be similar to the decoders/demultiplexers discussed from page 9–160 to page 9–166 of "The Integrated Circuits Catolog for Design Engineers," First Edition, of Texas Instruments, Inc.

The command decoder 321 converts the five input lines from the command register circuit 213 into 32 output control lines, with each output control line containing either a binary 1 or a binary 0 state signal. One of these output control lines may carry the RF switch command (a binary 1) which, as indicated in regard to FIG. 5, is applied to the RF switch register circuit 218. Another output control line may carry the upstream gain command (a binary 1) which, as indicated in regard to FIG. 5, is applied to the upstream amplifier gain register circuit 217. The remaining output control lines are also shown for selectively carrying the downstream gain command, the downstream tilt command, the up command and various external commands, as previously described. It should be recalled, however, that only one command can be generated during any given downstream message.

Figure 11:
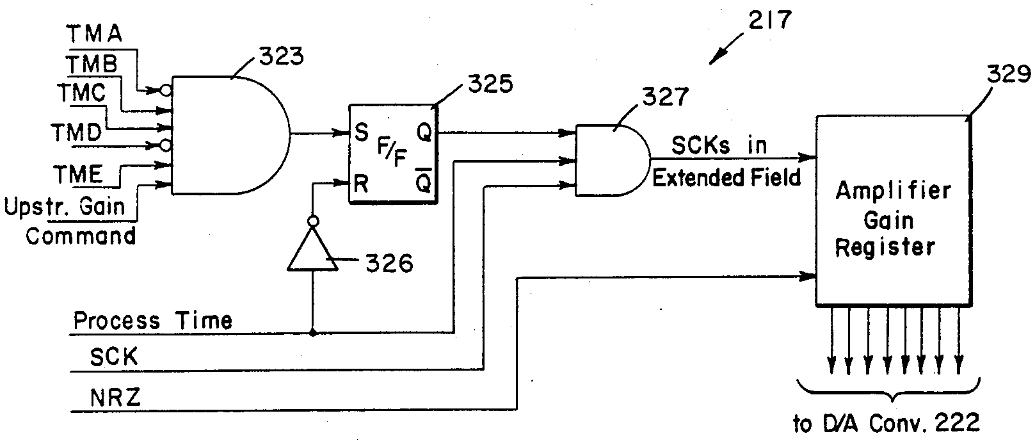
FIG. 11 is a schematic diagram of the amplifier gain register circuit of FIG. 5.

Referring now to FIG. 11, the upstream amplifier gain register circuit 217 of FIG. 5 is more fully illustrated. The upstream gain command from the command decoder 321 in FIG. 10 is applied, along with the TMA, TMB, TMC, TMD and TME timing signals to an AND gate 323, with only the TMA and TMD waveforms being inverted at the inputs of the AND gate 323. The output of the AND gate 323 is applied to the set side of a flip-flop 325 while the process time waveform 239 is inverted by an inverter 326 and applied to the reset (R) side of the flip-flop 325. By this means the flip-flop 325 is placed in a reset condition at the termination of the previous process time signal, at the end of the previous message at a corresponding time $T_{32}$. The flip-flop 325 remains in this reset condition until the end of the parity bit time $T_{24}$, at which time the TMA, TMB, TMC, TMD and TME waveforms are respectively in 0, 1, 1, 0 and 1 binary states. At this time the AND gate 323 allows the upstream gain command to pass through to set the flip-flop 325 such that its Q output goes to a 1 state. This 1 state output from the Q side of the flip-flop 325 is applied to one input of an AND gate 327. The process time waveform and SCK pulses are also applied as inputs to the AND gate 327. With this mechanization the AND gate 327 will only pass the eight command function SCK pulses occurring during the command function time, illustrated by the waveform 269 in FIG. 7. As indicated, these occur between the time when the flip-flop 325 is set ($T_{24}$) and when the flip-flop 325 is reset at the end of the process time ($T_{32}$) by the inversion of the negative-going trailing edge of the waveform 239. These eight command function SCK pulses are applied to an amplifier gain register 329 to allow the register 329 to serially clock in the eight bits of NRZ data, or command function bits, which occur between time $T_{24}$ and time $T_{32}$. The amplifier gain register 329 may be similar to the command register 303 in FIG. 9. The eight bits of NRZ data that are stored in the register 329 between times $T_{24}$ and $T_{32}$ are read out in parallel and applied to the D/A converter 222 (FIG. 5). As stated previously, the analog output of the D/A converter 222 is used to control the gain of the upstream amplifier 51 in FIG. 5.

Th RF switch register circuit 218 of FIG. 5 is illustrated in detail in FIG. 12. The circuits 333, 335, 336, 337 and 339 of FIG. 12 are respectively similar in structure and operation to the circuits 323, 325, 326, 327 and 329 illustrated in FIG. 11. The circuits of FIG. 12 have the same inputs as those of FIG. 11, with the exception that the AND gate 333 is enabled by an RF switch command rather than by the upstream gain command of FIG. 11. Five of the eight bits out of the RF switch register 339 are used as attenuator control signals to respectively control the switches 123 through 127 in the switchable attenuators 53 of FIG. 3 (or 5). The remaining three of the eight bits out of the RF switch register 339 are used as filter control signals to respectively control the switches 111, 113 and 115 in the switching circuit 55 of FIG. 3 (or 5). By comparing FIGS. 11 and 12, it is obvious that if an upstream gain command is generated by the command decoder circuit 221 of FIG. 5, the following eight bits of NRZ data occurring in the period $T_{24}$–$T_{32}$ will be utilized to change the outputs of the amplifier gain register 329 (FIG. 11). Since an RF switch command was not generated, the circuitry of FIG. 12 would not be enabled. Therefore, the outputs of the RF switch register 339 of FIG. 12 will not be changed. In a like manner, if an RF switch command, a downstream tilt command or a downstream gain command is generated by the command decoder circuit 221 of FIG. 5, the eight bits of NRZ data in the extended field would be utilized to change the outputs of only the register circuit associated therewith (see FIG. 5). No register circuits are shown for the up command and external commands, since no command function bits are utilized in a downstream message with these commands. This is due to the fact that the equipment 29, as well as the ancillary equipment 59, contain circuits which are enabled by the command from the decoder circuit 21 rather than control signals from register circuits.

Figure 13:
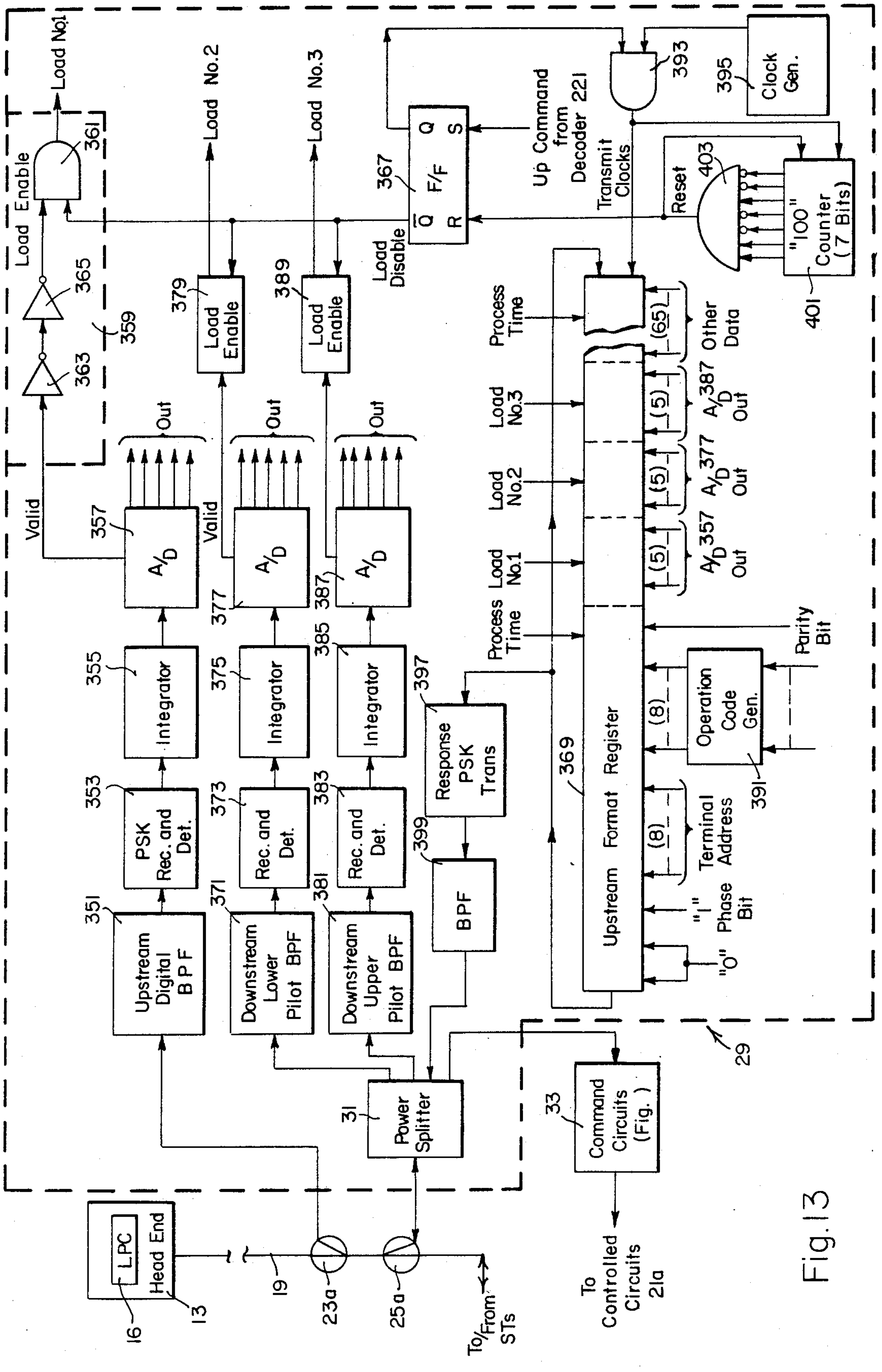
FIG. 13 is a schematic diagram of the upstream/-downstream signal monitoring equipment of FIG. 5.

By referring to FIGS. 13 and 14, the equipment 29 (FIG. 5) will now be explained in detail. Upstream digital transmissions from subscriber and phantom subscriber terminals downstream of the equipment 29 pass through the upstream tap 23*a* into an upstream digital bandpass filter 351. The filter 351 has a bandpass from 21 to 25 MHz. Upstream transmissions passing through the filter 351 are demodulated by a PSK receiver and detector 353. The digital information from the receiver 353 is integrated by an integrater 355 which has a relatively long time constant of, for example, 10 seconds in order to develop a relatively stable DC output voltage indicative of the amplitude of the upstream digital transmissions. This DC voltage from the integrater 355 is an analog voltage which is converted into a five bit digital signal by an A/D converter 357.

Each time that the A/D converter 357 completes a conversion of a newly changed input analog voltage to a digital output voltage, a 1 state valid signal is generated and applied to a load enable circuit 359. In the load enable circuit 359 the valid signal from the A/D converter 357 is delayed by two serially coupled inverters 363 and 365 before being applied as a first input to an AND gate 361, so that the AND gate 361 will not become operative until the output of the A/D converter 357 has stabilized. A second input to the AND gate 361 is applied from the Q side of a flip-flop 367. Until the flip-flop 367 is set by an "up" command from the decoder circuit 221 in FIG. 5, it remains in a reset condition with its Q output being in a 1 state. As a result, when no up command is applied to the equipment 29, the AND gate 361 develops a load No. 1 signal every time that a delayed valid signal is applied thereto. This load No. 1 signal is, in turn, applied to an upstream format register 369 to enable the output from the A/D converter 357 to be loaded into the register 369.

The upstream format register 369 is basically composed of a serially coupled sequence of flip-flops, each of which loads in one bit of message upon the application of an associated loading signal. With the use of this register 369 an upstream message of, for example, 100 bits may be formatted in the equipment 29 for subsequent upstream transmission upon command.

The lower and upper pilot tones in the downstream transmission are passed through the downstream tap 25A and the power splitter 31 before being respectively passed through the downstream lower and upper pilot tone bandpass filters 371 and 381. The filter 371 has a frequency bandpass of from 50 to 54 MHz, while the filter 381 has a frequency bandpass of from 270 to 274 MHz. The output of the filter 371 is sequentially demodulated by a receiver and detector 373, integrated by an integrater 375 to develop an analog DC voltage, and applied to an A/D converter 377 in order to develop a five-bit digital output representative of the analog amplitude of the downstream lower pilot tone. After the completion of the conversion by the A/D converter 377, a 1 state valid signal is applied to a load enable circuit 379 which subsequently develops a load No. 2 signal. This load No. 2 signal is used by the register 369 to load the five bit digital output of the A/D converter 377 into the register 369. The circuits 371, 373, 375, 377 and 379 are similar in structure and operation to the circuits 351, 353, 355, 357 and 359 previously discussed.

A downstream upper pilot tone channel, comprising the filter 381, a receiver and detector 383, an integrater 385, an A/D converter 387 and a load enable circuit 389, operates to develop a five-bit digital output representative of the amplitude of the downstream upper pilot tone. The circuits 381, 383, 385, 387 and 389 are respectively similar in structure and operation to the circuits 351, 353, 355, 357 and 359 previously discussed. A load No. 3 signal is generated by the load enable circuit 389 after the application of a 1 state valid signal thereto. This load No. 3 signal enables the register 369 to load in the five bit digital output of the A/D converter 387.

It should be noted that the $\overline{Q}$ side of the flip-flop 367 is also coupled to the load enable circuits 379 and 389, as well as to the load enable circuit 359. Therefore, the load enable circuits 359, 379 and 389 will all be enabled to respectively develop the load No. 1, load No. 2 and load No. 3 loading signals until an up command sets the flip-flop 367. When the flip-flop 367 is set, its $\overline{Q}$ output changes to a 0 state, thereby preventing the load enable circuits 359, 379 and 389 from respectively developing their associated loading signals. As a result, the register 369 will not be enabled to update the digital information previously stored therein from the A/D converters 357, 377 and 387 until the flip-flop 367 has been reset (to be explained later).

A typical 100-bit upstream message loaded into the register 369 may comprise two binary 0's, a 1 state phase bit, an eight bit terminal address, an eight bit operation code from an operation code generator 391, a parity bit, the five bit digital output from the A/D converter 357, the five bit digital output from the A/D converter 377, the five bit digital output from the A/D converter 387 and perhaps 65 bits of other data from other equipment (not shown) to be sent upstream. The two binary 0's are inserted to enable the LPC 16 to prepare its circuits before the application of the phase bit. The phase bit may then be used to start timing circuits (not shown) in the LPC 16 in order to clock the remaining upstream message into the LPC 16. The terminal address is used to identify the particular phantom subscriber. The operation code may identify the particular operation that the phantom subscriber 27*a* is performing. The operation code generator may therefore the digital information, that was at the J and K inputs of each flip-flop before the transmit clock was applied, is transferred to the Q and $\bar{Q}$ outputs thereof. In this manner the 100 bits of upstream message stored in the register 369 is shifted out of the register 369 for upstream transmission, as well as for restorage in the register 369.

The invention thus provides a system for selectively controlling, upon command from a central station, the operation of a preselected plurality of circuits located between the central station and subscriber terminals in a cable television network. In this way the gain, slope, frequency bandpass and switching of all upstream and downstream transmissions passing through the plurality of circuits can be controlled. Furthermore, numerous functions associated with ancillary equipment may also be controlled by the system upon command from the central station.

While the salient features have been illustrated and described, it should be readily apparent to those skilled in the art that modifications can be made within the spirit and scope of the invention as set forth in the appended claims.

What is claimed is:

1. In a cable television network having a distribution network for transmitting a plurality of two-way signals between a central station and a plurality of subscriber stations, a system comprising:

a plurality of first circuits disposed at first predetermined positions in the distribution network;

first means disposed at a second predetermined position in the distribution network, said first means being responsive to signal information specifically addressed thereto from the central station for selectively generating a plurality of command signals as a function thereof; and a plurality of second means coupled to said plurality of first circuits and to said first means, each of said second means being responsive to the signal information and an associated command signal for controlling the operational state of an associated first preselected one of said first circuits as a function of the signal information, the operational states of said first preselected first circuits operating to control the two-way signals.

2. The system of claim 1 wherein each of said plurality of second means includes:

storage means, coupled to said first means, being responsive to an associated one of the command signals for selectively extracting a portion of the signal information for use in controlling the operational state of an associated one of said plurality of first circuits.

3. The system of claim 1 further including:

first receiver means coupled to the distribution network for deriving amplitude information from selected ones of said plurality of two-way signals; and transmitter means, coupled to the distribution network and to said first receiver means, being responsive to a first command signal from said first means for transmitting the amplitude information to the central station.

4. The system of claim 1 wherein said plurality of first circuits includes:

a plurality of second circuits selectively coupled to said plurality of second means and to the distribution network for controlling the operation of the two-way signals applied thereto; and a plurality of ancillary equipments, coupled to said first means, being selectively responsive to associated command signals for performing preselected functions ancillary to the control of the two-way signals.

5. The system of claim 4 wherein said plurality of second circuits includes:

a first amplifier serially coupled to the distribution network for controlling signals transmitted therethrough from the central station;

a second amplifier serially coupled to the distribution network for controlling signals transmitted therethrough from a plurality of subscriber stations; and switched filter means serially coupled to the distribution network for attenuating selected portions of the signals transmitted thereto from the plurality of subscriber stations.

6. The system of claim 4 wherein said first means includes:

signal receiver means coupled to the distribution network for extracting signal information from the signals transmitted from the central station;

third means coupled to said signal receiver means for developing a first signal in response to the signal information specifically addressed thereto; and command means, coupled to said signal receiver means, being responsive to the first signal and the signal information for selectively generating the plurality of command signals.

7. The system of claim 1 wherein said first means includes:

signal receiver means coupled to the distribution network for extracting signal information from the signals transmitted from the central station;

third means, coupled to said signal receiver means, being responsive to the signal information specifically addressed thereto for developing a first signal; and command means, coupled to said signal receiver means, being responsive to the first signal and the signal information for selectively generating the plurality of command signals.

8. The system of claim 7 wherein each of said plurality of second means includes:

storage means coupled to said signal receiver means, each said storage means being responsive to its associated command signal for selectively extracting a portion of the signal information for use in controlling the operational state of an associated one of said plurality of first circuits.

9. The system of claim 8 wherein said plurality of first circuits includes:

a plurality of second circuits selectively coupled to said plurality of storage means and to the distribution network for controlling the operation of the two-way signals applied thereto; and a plurality of ancillary equipments, coupled to said command means, being selectively responsive to associated command signals for performing preselected functions ancillary to the control of the two-way signals.

10. The system of claim 9 further including:

first receiver means coupled to the distribution network for deriving amplitude information from sereceive binary information from other circuits (not shown). The parity bit is included, for the same reason given in the discussion in relation to the downstream message, namely, to increase the reliability of the upstream message. The two binary 0's, the phase bit, the terminal address, the operation code and the parity bit may all be hardwired into the register 369. To enable the two binary 0's, the phase bit, the terminal address, the operation code, the parity bit and the 65 bits of other data to be loaded into the register 369 at the start of each process time waveform ($T_2$), the process time waveform 239 is applied to associated flip-flops (not shown) in the register 369.

Until the time that an up command is developed by and received from the decoder 221 (FIG. 5), the register 369 is constantly updating itself in relation to new information from the A/D converters 357, 377, 387 and other data from other equipment (not shown), as discussed above.

It should be recalled that when an "up" command (or one of the external commands) is generated within the period $T_{23}$–$T_{24}$ of a downstream message by the command decoder 221 (after the generation of the address OK and parity OK signals), no command function bits in that downstream message are utilized by the phantom subscriber 27*a*. Therefore, an upstream transmission from the phantom subscriber 27*a* can be started at time $T_{24}$ of the downstream message. Assume that an up command has been generated by the decoder 221. The up command sets the flip-flop 367, causing its Q output to go to a 1 state and its $\bar{Q}$ output to go to a 0 state. The 0 state from the $\bar{Q}$ output of the flip-flop 367 disables the AND gate 361 in each of the load enable circuits 359, 379 and 389 to prevent the generation of the load No. 1, load No. 2, and load No. 3 signals. Without these three load signals the A/D outputs stored in the register 369 cannot be changed even with changes in the levels of the upstream digital and downstream upper and lower pilot tones.

The 1 state from the Q output of the flip-flop 367 is applied to one input of an AND gate 393. Transmit clocks from a clock pulse generator 395, which may be operated at a 1 MHz bit rate, are therefore applied through the AND gate 393 to the register 369 to enable the register to sequentially clock out the upstream digital message stored therein. This upstream message is clocked out and applied to a response PSK transmitter 397 in the following sequence: the two binary 0's, the 1 state phase bit, the terminal address, the operation code, the parity bit, the A/D converter 357 output, the A/D converter 377 output, the A/D converter 387 output and the 65 bits of other data. The 100 bits of digital information being sequentially read out of the register 369 is placed upon a PSK (phase shift keyed) carrier in the transmitter 397 and applied through a bandpass filter 399, the power splitter 31, the downstream tap 25*a* and the trunk line 19 for upstream transmission to the LPC 16.

The transmit clocks passing through the AND gate 393 are also applied to a seven bit counter 401. When a count of 100 is reached the outputs of the counter 401, starting from the most significant bit and proceeding to the least significant bit, are in binary 1, 1, 0, 0, 1, 0 and 0 states. These seven bits are applied to an AND gate 403 which has selected ones of its inputs inverted so that it will only develop a 1 state reset pulse when the counter 401 has reached a count of 100. At this time, the reset pulse resets the counter 401 to a 0 count and resets the flip-flop 367 to prevent the AND gate 393 from passing any more clock pulses from the clock generator 395. The $\bar{Q}$ output of the flip-flop 367 also returns to a 1 state to enable the load enable circuits 359, 379 and 389 to develop their associated loading signals every time new analog information is received by any of the A/D converters 357, 377 and 387. It should also be noted that the output of the register 369 is coupled back to its input so that at the completion of the 100 clockings the information in the register 369 is back in its original position.

Figure 14:
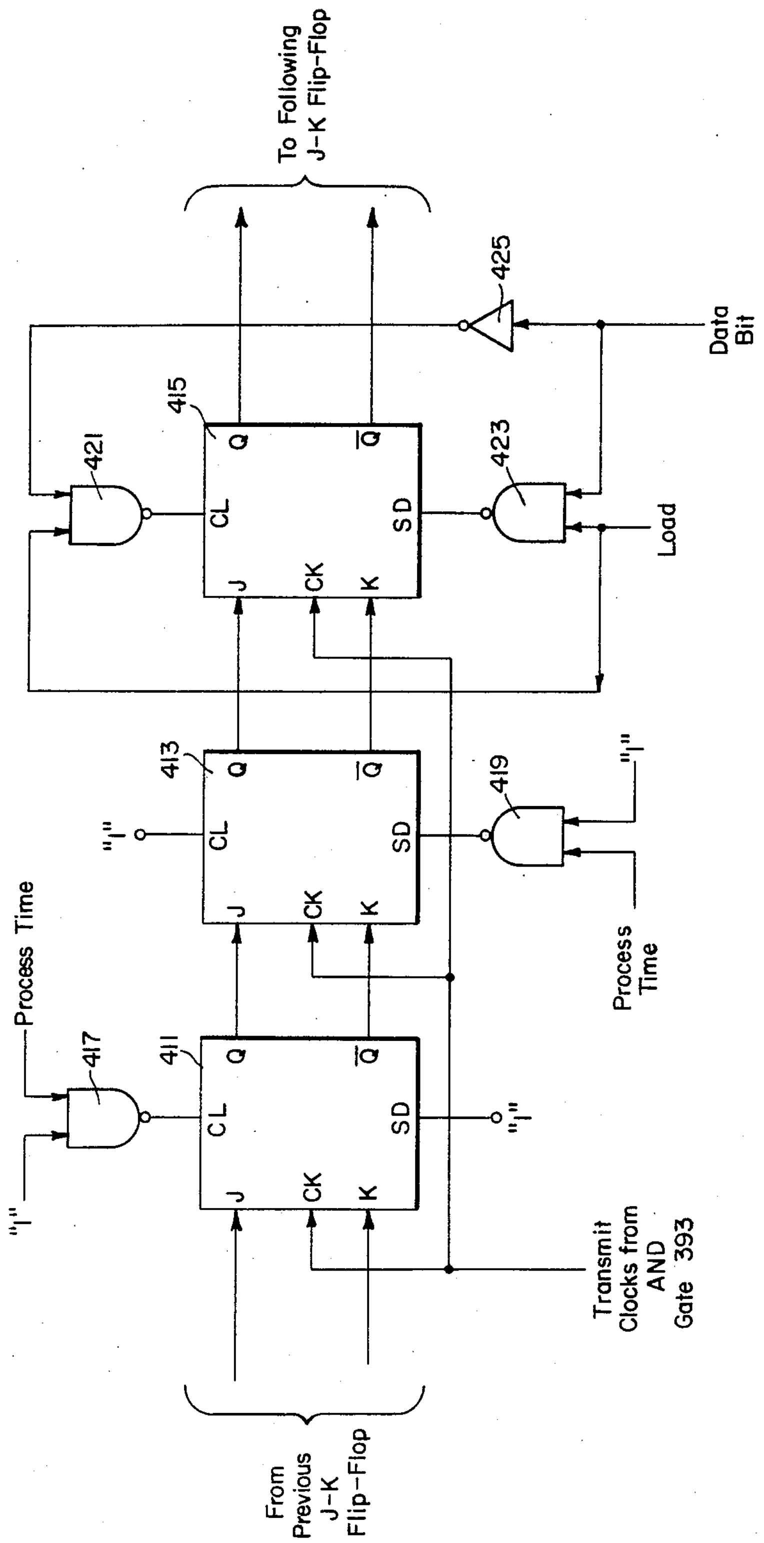
FIG. 14 is a schematic diagram of some of the circuits which may be used in the upstream format register of FIG. 13.

An illustrative example of the types of flip-flops that may be found in the register 369 is shown in FIG. 14. FIG. 14 illustrates a group of three serially coupled J-K flip-flops 411, 413 and 415. The Q and $\bar{Q}$ outputs of each J-K flip-flop are coupled to the J and K inputs, respectively, of the following flip-flop, with the Q and $\bar{Q}$ outputs of the last J-K flip-flop in the register 369 being respectively coupled back to the J and K inputs of the first flip-flop in the register 369. In loading information into the register 369, the J-K flip-flops in the register 369 can be mechanized to clear only on a 0 state, to set only on a 0 state, or to set on a 0 and clear on a 0.

For example, the flip-flop 411 can only be cleared with a 0 state input. To accomplish this result, the flip-flop 411 has its clear (CL) input coupled to the output of a NAND gate 417 and its set direct (SD) input coupled to a binary 1. The NAND gate 417 utilizes a fixed 1 state and the process time waveform 239 as its inputs. As a result, at the start of the process time ($T_2$) the NAND gate 417 develops a 0 state in order to clear the flip-flop 411 so that its Q and $\bar{Q}$ outputs are respectively in binary 0 and 1 states.

The flip-flop 413, on the other hand, has a NAND gate 419 coupled to its set direct input, while its clear input is coupled to a binary 1. A binary 1 and the process time waveform are applied as inputs to the NAND gate 419 to develop a 0 state output at the start of the process time ($T_2$). At this time, the flip-flop 413 is set such that its Q and $\bar{Q}$ outputs are respectively in 1 and 0 states. It is therefore apparent that the flip-flop 411 will only load in a 0 at the start of the process time, whereas the flip-flop 413 will only load in a 1 at the start of the process time.

The flip-flop 415 may be representative of any of the flip-flops in the register 369 that are used to store the outputs of the A/D converters 357, 377 and 387, as well as the 65 bits of other data. This flip-flop 415 is so mechanized that the outputs of NAND gates 421 and 423 are respectively coupled to its CL and SD inputs. The load signal from, for example, the load enable circuit 359, is applied to one input of each of the NAND gates 421 and 423. A data bit from the associated A/D converter 357 is directly applied to a second input of the NAND gate 423, but is inverted by a logical inverter 425 before being applied to a second input of the NAND gate 421. With the mechanization of flip-flop 415 as shown, the flip-flop 415 will be set whenever the data bit is in a 1 state or will be cleared whenever the data bit is in a 0 state. By this means the Q output of the flip-flop 415 will correspond to the state of the data bit (from the A/D converter 357) being loaded into the flip-flop 415.

Transmit clocks from the AND gate 393 are applied to the clock (CK) inputs of the J-K flip-flops in the register 369. With the application of each transmit clock, lected ones of said plurality of two-way signals; and transmitter means coupled to the distribution network and to said first receiver means, for transmitting the amplitude information to the central station in response to a first command signal from said first means.

11. The system of claim 1 further including: a plurality of third circuits coupled to said first means, each of said third circuits being responsive to an associated command signal for performing a preselected function ancillary to the control of the two-way signals.

12. The system of claim 11 further including:

first receiver means coupled to the distribution network for deriving amplitude information from selected ones of said plurality of two-way signals; and transmitter means coupled to the distribution network and to said first receiver means for transmitting the amplitude information to the central station in response to a first command signal from said first means.

13. The system of claim 12 wherein said first means includes:

second receiver means coupled to the distribution network for extracting signal information from the signals transmitted from the central station;

third means coupled to said second receiver means for developing a first signal in response to the signal information specifically addressed thereto; and command means, coupled to said second receiver means, being responsive to the first signal and the signal information for selectively generating the plurality of command signals.

14. The system of claim 13 wherein each of said plurality of second means includes:

storage means coupled to said second receiver means, each said storage means being responsive to its associated command signal for selectively extracting a portion of the signal information for use in controlling the operational state of an associated one of said plurality of first circuits.

15. The system of claim 14 wherein said plurality of first circuits includes:

a first amplifier serially coupled to the distribution network for controlling signals transmitted therethrough from the central station;

a second amplifier serially coupled to the distribution network for controlling signals transmitted therethrough from a plurality of subscriber stations; and switched filter means serially coupled to the distribution network for attentuating selected portions of the signals transmitted thereto from the plurality of subscriber stations.

16. In a two-way CATV network having a distribution network for transmitting two-way signals between a central station and a plurality of subscriber stations, a system comprising:

first means coupled to the distribution network for selectively generating a plurality of first and second command signals;

second means coupled to said first means for developing a plurality of control signals in response to the first command signals and a preselected one of said plurality of two-way signals;

a plurality of controlled circuits coupled to said second means for selectively controlling the two-way signals applied thereto in response to the selective application of the first command signals; and a plurality of ancillary equipments coupled to said first means for selectively performing predetermined functions ancillary to the control of two-way signals in response to the selective application of the second command signals.

17. In a CATV network having a distribution network for transmitting a plurality of upstream and downstream signals between a central station and a plurality of subscriber stations, a system comprising:

first receiver means coupled to the distribution network for deriving amplitude information from preselected ones of the plurality of upstream and downstream signals applied thereto;

second receiver means coupled to the distribution network for deriving data information from a preselected downstream signal;

first means coupled to said second receiver means for selectively generating a plurality of control signals as a function of command data specifically addressed thereto from the central station;

transmitter means coupled to said first receiver means and to the distribution network for transmitting the amplitude information to the central station in response to a preselected control signal from said first means; and a plurality of circuits coupled to said first means and to the distribution network for selectively controlling the downstream and upstream signals applied thereto in response to associated control signals.

18. In a cable television network including a central station, a plurality of remotely located subscriber stations and a cable distribution network for allowing the central station to transmit downstream TV, pilot and digital signals to the subscriber stations and to receive frequency bands of upstream digital and TV signals from the subscriber stations, a system comprising:

first receiver means coupled to the cable distribution network for deriving amplitude information from the downstream pilot and upstream digital signals applied thereto;

second receiver means coupled to the cable distribution network for extracting signal information from the downstream digital signals;

first means coupled to said second receiver means for developing a first signal in response to signal information specifically addressed thereto;

command means, coupled to said second receiver means, being responsive to the first signal and the signal information for selectively generating a plurality of first and second command signals as a function of the signal information;

transmitter means coupled to the cable distribution network and to said first receiver means for transmitting the amplitude information to the central station in response to a predetermined first command signal from said command means;

second means coupled to said second receiver means and said command means for developing a plurality of control signals in response to signal information and the selective generation of second command signals; and a plurality of first circuits coupled to the cable distribution network for selectively controlling the downstream and upstream signals applied thereto in response to the selective application of control signals from said second means.

* * * * *